US007926788B2

(12) United States Patent
Plummer

(10) Patent No.: US 7,926,788 B2
(45) Date of Patent: Apr. 19, 2011

(54) CONDUIT ATTACHMENT SYSTEM FOR A CABLE PULLER

(75) Inventor: Jeffrey J. Plummer, Rockford, IL (US)

(73) Assignee: Textron Innovations Inc., Providence, RI (US)

( * ) Notice: Subject to any disclaimer, the term of this patent is extended or adjusted under 35 U.S.C. 154(b) by 484 days.

(21) Appl. No.: 11/744,598

(22) Filed: May 4, 2007

(65) Prior Publication Data
US 2007/0284559 A1 Dec. 13, 2007

Related U.S. Application Data

(63) Continuation-in-part of application No. 11/199,695, filed on Aug. 9, 2005, now Pat. No. 7,216,848.

(51) Int. Cl.
*E21C 29/16* (2006.01)
(52) U.S. Cl. .............................. 254/134.3 FT
(58) Field of Classification Search ......... 254/134.4 FT, 254/389, 403, 407; 269/101, 247, 138, 163, 269/189, 190, 237, 239, 238, 240, 242, 243, 269/244, 902, 156, 162, 174; 29/256; 81/346, 81/390, 389; 251/9
See application file for complete search history.

(56) References Cited

U.S. PATENT DOCUMENTS

| | | | | |
|---|---|---|---|---|
| 57,447 A * | 8/1866 | Stockmar | ........................... | 269/6 |
| 848,036 A * | 3/1907 | Kruger | ........................... | 269/156 |
| 2,221,903 A | 11/1940 | Abramson et al. | | |
| 2,416,228 A * | 2/1947 | Sheppard | ........................... | 408/105 |
| 2,453,948 A * | 11/1948 | Turnepseed | ........................... | 15/94 |
| 2,601,407 A | 6/1952 | Marshall | | |
| 2,699,601 A | 1/1955 | Darnell | | |
| 2,951,672 A | 9/1960 | Bott | | |
| 3,190,616 A | 6/1965 | Oleson | | |
| 3,453,948 A * | 7/1969 | Murphy | ........................... | 99/433 |
| 3,968,952 A * | 7/1976 | Newell | ........................... | 254/134.3 R |
| 4,070,011 A | 1/1978 | Glesser | | |
| 4,456,225 A | 6/1984 | Lucas | | |
| 5,096,163 A | 3/1992 | Swearingen | | |
| 5,193,826 A | 3/1993 | Smith | | |
| 6,134,798 A | 10/2000 | Duncan et al. | | |
| 6,286,815 B1 | 9/2001 | Ray | | |
| 6,682,050 B1 | 1/2004 | Ray | | |
| 6,708,930 B2 | 3/2004 | Heath | | |
| 6,769,669 B2 | 8/2004 | Cook et al. | | |
| 7,059,587 B1 | 6/2006 | Fimple | | |
| 2005/0051759 A1 | 3/2005 | Plummer | | |

* cited by examiner

*Primary Examiner* — Lee D Wilson
*Assistant Examiner* — Jamal Daniel
(74) *Attorney, Agent, or Firm* — Clark Hill PLC

(57) ABSTRACT

An attachment system for a cable puller provides for securing the cable puller to various sized conduits. The attachment system includes a clamping assembly having pivotable arms angled to generally be formed in V-shapes at the ends which engage and trap the conduit at four separate points. The clamping arms have gripping members that radially nest against the conduit threads and an overhang portion which acts as a location stop for the conduit. Each clamping arm has a face which extends past the pivot point. A screw and a nut between the extended portion of the clamping arms act on a push block which in turn acts against the arm faces such that when the nut is screwed inward, it causes the gripping members to be forced against the conduit in order to secure the conduit in place.

17 Claims, 21 Drawing Sheets

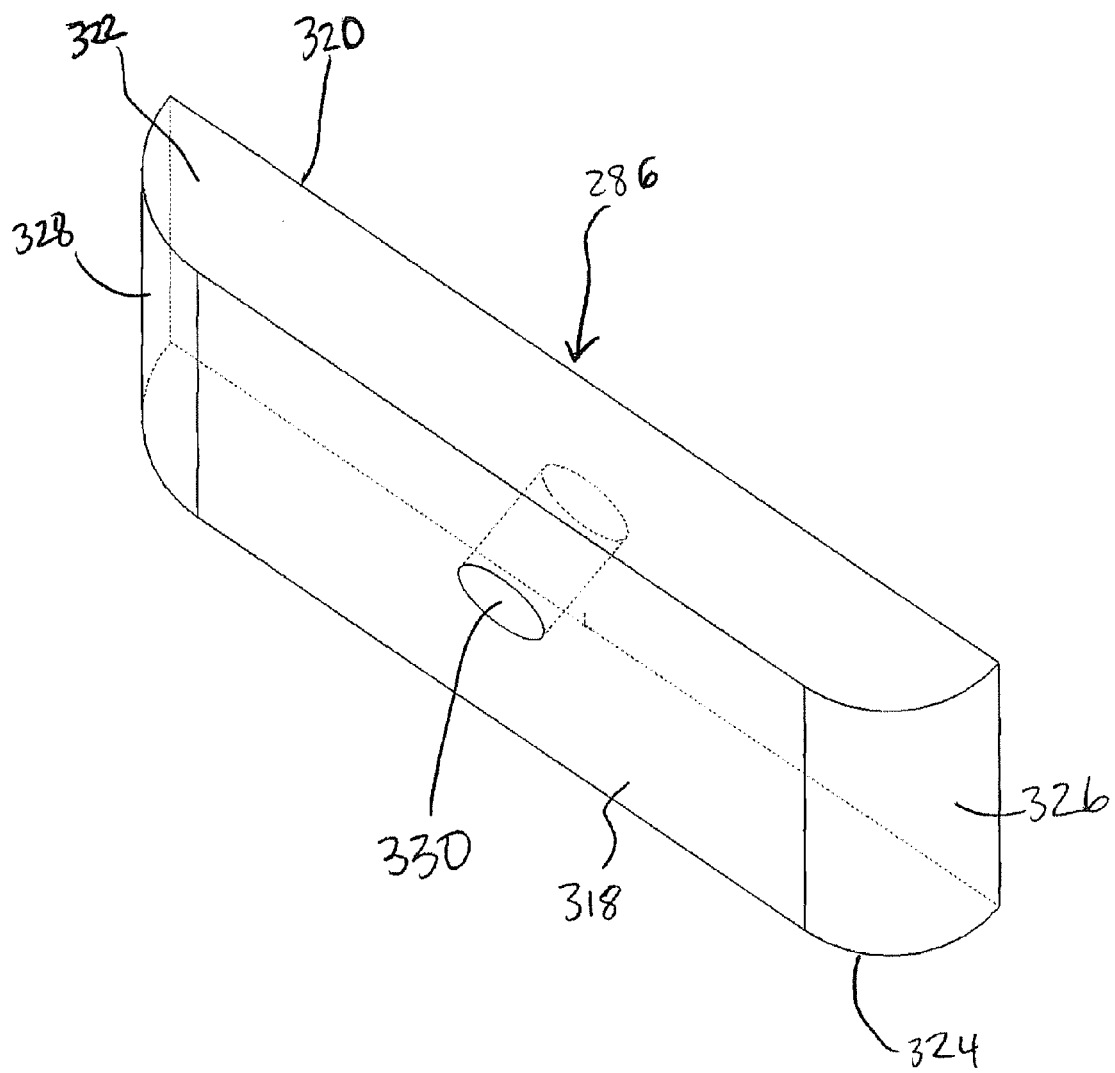

CONDUIT ATTACHMENT SYSTEM FOR A CABLE PULLER

CROSS-REFERENCE AND INCORPORATION BY REFERENCE

This application is a Continuation-In-Part of U.S. application Ser. No. 11/199,695, entitled "Conduit Attachment System For A Cable Puller", filed Aug. 9, 2005. U.S. patent application Ser. No. 11/199,695 is hereby incorporated by reference.

BACKGROUND OF THE INVENTION

This invention is generally directed to an attachment system for a cable puller. Cable pullers are often used to pull cables or wires, for example, telephone wires, optical cables, or electrical service cables, through conduit. A typical cable puller generally includes a base and a boom extending from the base. An elbow is provided at the free end of the boom and an adaptor is mounted to the elbow. The adaptor generally includes brackets for attaching the adaptor to the elbow and a cylindrically-shaped extension for attaching the adaptor to the conduit through which the cable is pulled.

A first example of a prior art adaptor is shown in FIG. 1. The adaptor 20 includes a bracket 21 and a cylindrically-shaped extension 22 extending therefrom. The extension 22 is designed to fit within the end of the conduit through which the cable is to be pulled. The outer diameter of the cylindrically-shaped extension 22 is therefore slightly smaller than the inner diameter of the conduit to allow the extension 22 to nest within the conduit. A plurality of adaptors 20 having various diameters are provided so that the adaptor 20 can be sized to the conduit. Although an adaptor having an extension with a much smaller diameter could nest within the conduit, the adaptor would then restrict the opening through which the wire/cable was to be pulled.

A second example of a prior art adaptor is shown in FIG. 2. The adaptor 30 includes a bracket 31 and a cylindrically-shaped extension 32 having threads on the internal surface thereof. The adaptor 30 is mounted to a conduit by engaging the threads of the extension 32 with threads on the outer surface of the conduit. In order for the threads of the extension 32 to engage with the threads of the conduit, the adaptor 30 must be sized to the conduit. Thus, as with the adaptor 20 shown in FIG. 1, several adaptors 30 are needed to accommodate a variety of conduit diameters.

BRIEF SUMMARY OF THE INVENTION

In a first embodiment of the invention, an adaptor provides for attachment of the cable puller to various sized conduits. The adaptor provides a truncated, V-shaped area in which the conduit rests. A T-shaped clamp secures the adaptor to the conduit. Gripping members are provided proximate the V-shaped area. The gripping members include ribs which mesh with a thread on the outer surface of the conduit to provide a secure connection between the cable puller and the conduit.

In a second embodiment of the invention, an attachment system for a cable puller provides for securing the cable puller to various sized conduits. The attachment system includes a clamping assembly having pivotable arms which are angled, or have a V-form at the ends which engage and trap the conduit at four separate points. The clamping arms have gripping members that radially nest against the conduit threads and an overhang portion which acts as a location stop for the conduit. The clamping arms have a face which extends past the pivot point. A screw and a nut between the extended portion of the clamping aims act on a push block which in turn acts against the arm faces such that when the nut is screwed inward, it causes the gripping members of the clamping arms to be forced against the conduit in order to secure the conduit in place.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 24 is a perspective view of the push block of the clamping assembly.

Figure 1:
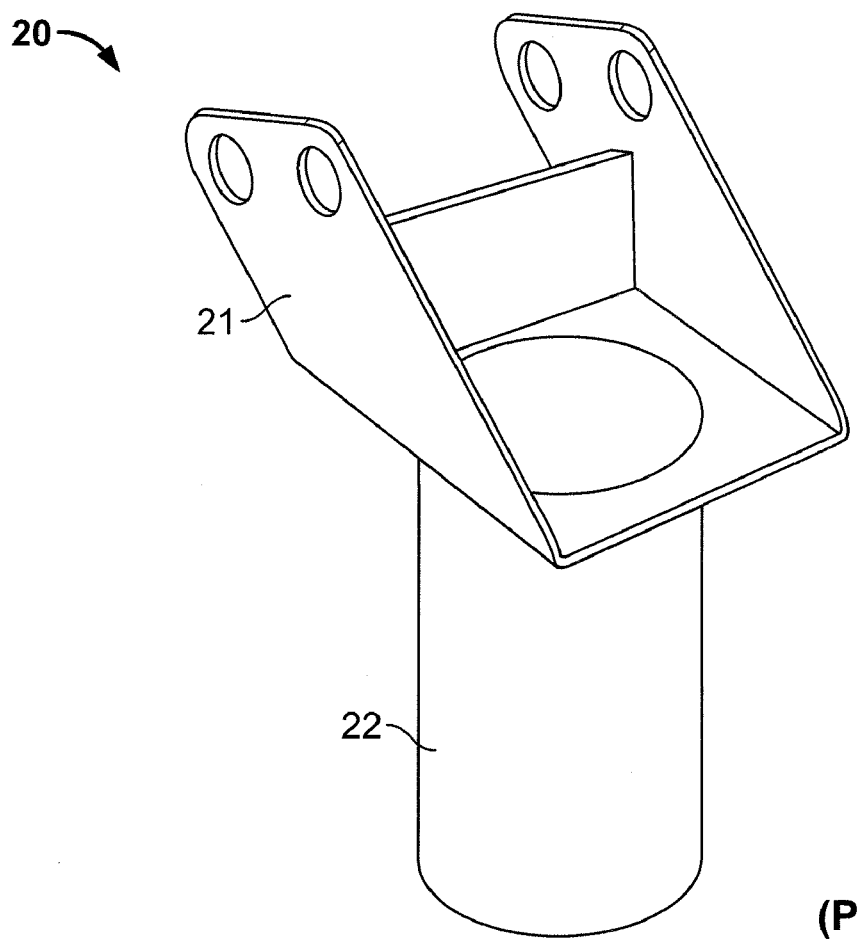
FIG. 1 is a perspective view of a prior art adaptor for use with a cable puller.
Figure 2:
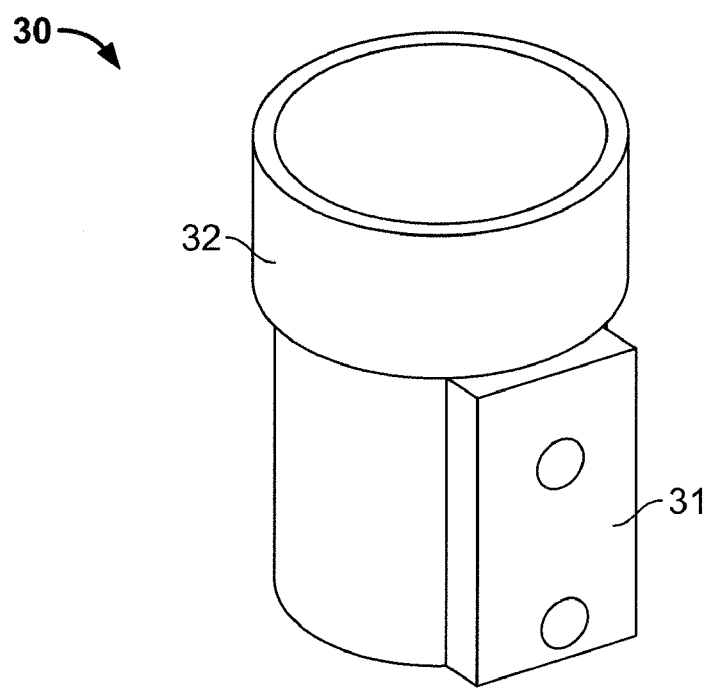
FIG. 2 is a perspective view of another prior art adaptor for use with a cable puller.

The present invention provides an attachment system for a cable puller which overcomes the problems presented in the prior art and which provides additional advantages over the prior art, such advantages will become clear upon a reading of the attached specification in combination with a study of the drawings.

DETAILED DESCRIPTION OF THE ILLUSTRATED EMBODIMENTS

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The attachment system which incorporates the features of a first embodiment of the invention, which includes an adaptor 49, along with a cable puller 40 is shown in FIGS. 3-10.

Figure 3:
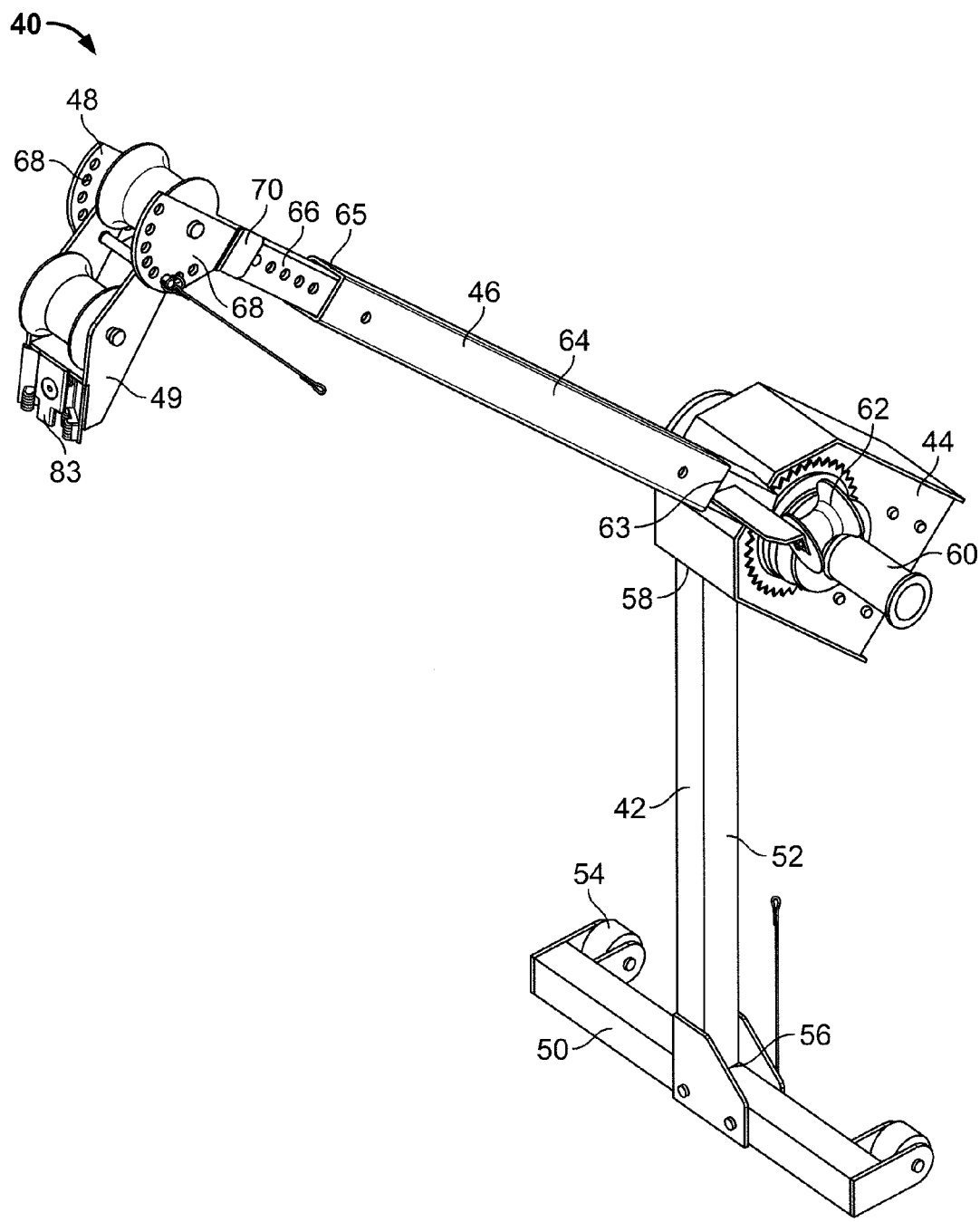
FIG. 3 is a perspective view of a cable puller with an attachment system incorporating features of a first embodiment of the present invention mounted thereto.

As best shown in FIG. 3, the cable puller 40 generally includes a base 42, a puller assembly 44, a telescoping boom 46 extending from the puller assembly 44, and an adjustable elbow 48. The adaptor 49 is mounted to the cable puller 40 at the elbow 48.

The base 42 generally includes a horizontal portion 50 which rests on the floor and a vertical portion 52 extending upwardly therefrom. Wheels 54 are provided proximate opposite ends of the horizontal portion 50 for transportation of the cable puller 40. The vertical portion 52 is elongated and includes a lower end 56 and an upper end 58. The lower end 56 is secured to a horizontal portion 50, proximate the center thereof. The upper end 58 is secured to the puller assembly 44.

The puller assembly 44 includes a capstan 60 about which the cable to be pulled is wound and a roller 62 for guiding the cable. The puller assembly 44 allows for adjustment of the angle between the base 42 and the boom 46.

The telescoping boom 46 includes an outer member 64 and an inner member 66. The outer member 64 has a first end 63 and a second end 65 and is formed from elongated side walls which form a square cross-section. Apertures are provided through opposite side walls of the outer member 64. The first end of the outer member 64 is secured to the puller assembly 44. The second end of the outer member 64 receives the inner member 66. The inner member 66 also has a first end and a second end and is also formed from elongated side walls which form a square cross-section. Apertures are provided through opposite side walls of the inner member 66. The perimeter of the inner member 66 is smaller than the perimeter of the outer member 64 to allow the inner member 66 to be positioned within the outer member 64. The inner member 66 is slidable relative to the outer member 64 to extend or reduce the effective length of the boom 46. Apertures through the inner member 66 are aligned with apertures of the outer member 64 and a pin (not shown) is passed through the aligned apertures to secure the relative positions of the inner and outer members 64, 66 of the boom 46. It is to be understood that the cross-section of the inner and outer members 64, 66 may be of a shape other than square.

Figure 4:
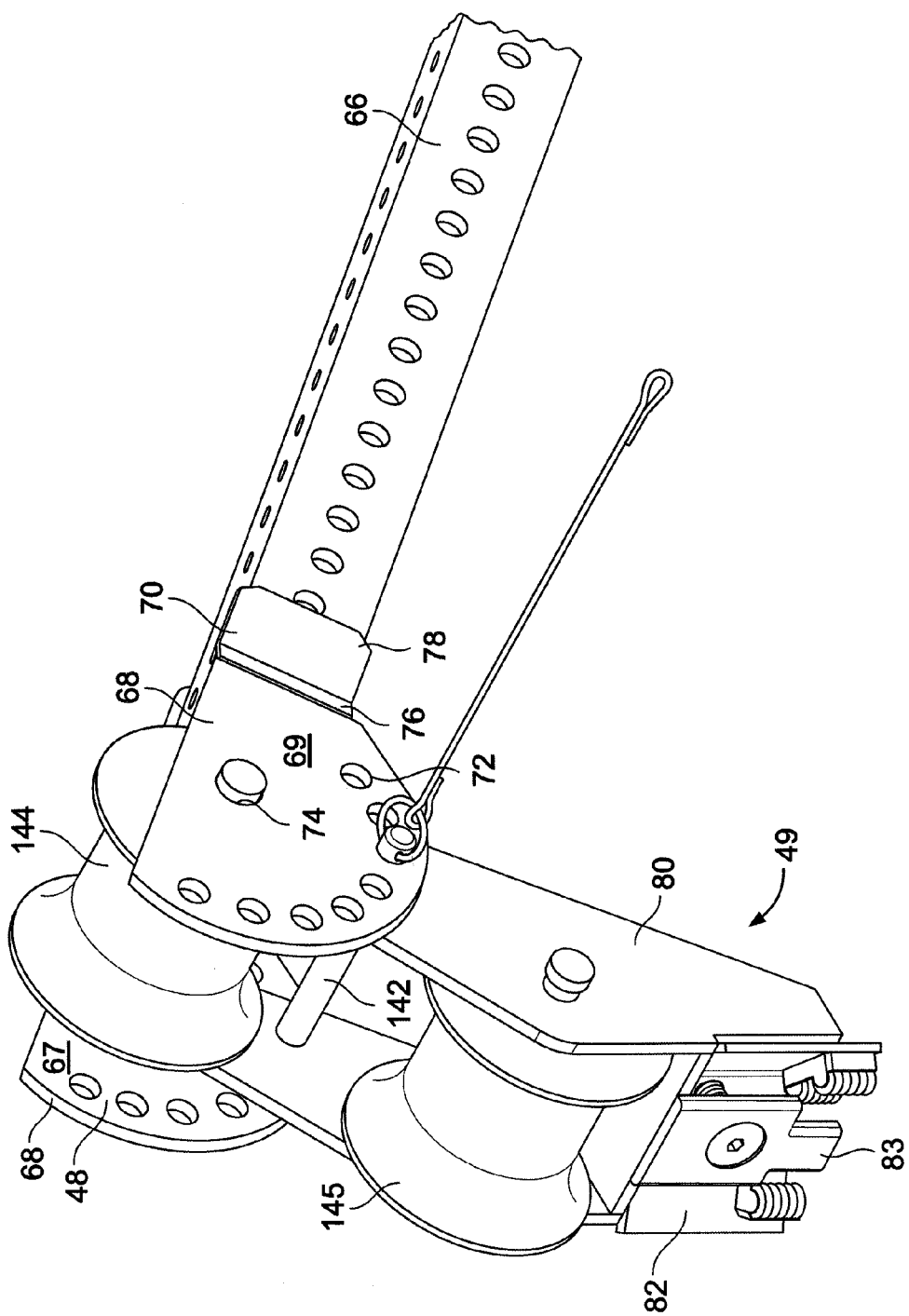
FIG. 4 is a perspective view of a portion of the cable puller and the attachment system of FIG. 3.

As best shown in FIG. 4, the adjustable elbow 48 includes two semi-circular plates 68, each having a brace 70 extending therefrom. The plates 68 are parallel and spaced from each other. Each plate 68 includes an inner surface 67 and an outer surface 69. A plurality of spaced apart adjustment apertures 72 are provided along the circumference of the plates 68 and a mounting aperture 74 is provided at the radial center of each plate 68. The brace 70 of each plate 68 includes a first portion 76 and a second portion 78. The first portions 76 are generally planar and rectangularly-shaped. The first portions 76 are angled inwardly relative to the plates 68. The second portions 78 are also generally planar and rectangularly-shaped. The second portions 78 extend from the respective first portions 76 and are generally parallel to the plates 68. The second portions 78 are spaced from each other such that the inner surfaces of the second portions 78 contact outer surfaces of the inner member 66 of the boom 46. The elbow 48 is secured to the inner member 66 of the boom 46 by conventional means.

The adaptor 49 generally includes a mounting member 80, an attachment member 82, a clamp 83, and a nut 85.

Figure 7:
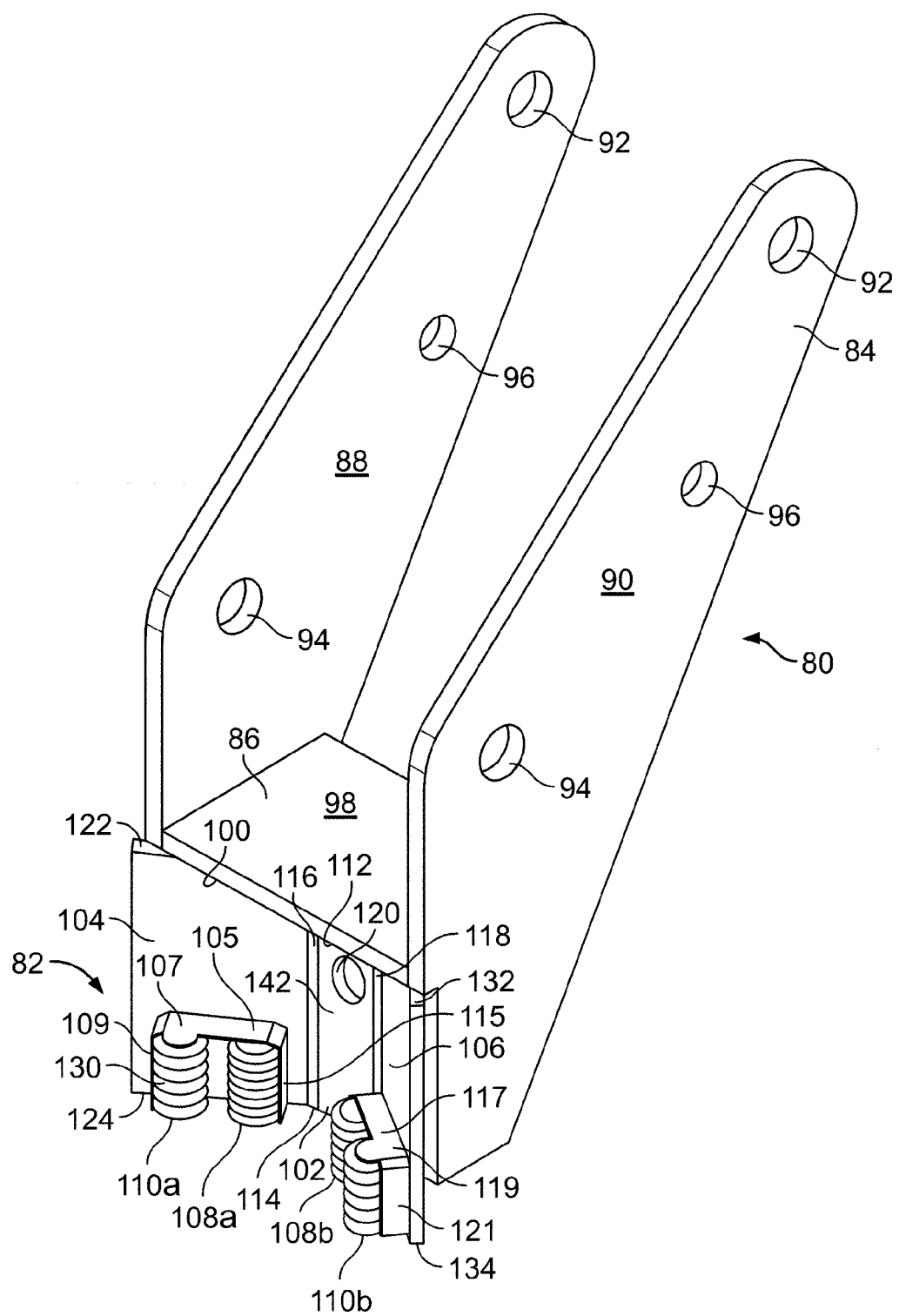
FIG. 7 is a perspective view of a portion of the adaptor of the attachment system.

As best shown in FIG. 7, the mounting member 80 generally includes two plates 84 and a brace 86. The plates 84 are generally triangularly-shaped and are positioned parallel to each other. Each plate 84 includes an inner surface 88 and an outer surface 90. Each plate 84 also includes a mounting aperture 92 proximate a first corner of the plate, a roller mounting aperture 94 proximate a second corner of the plate, and an adjustment aperture 96 spaced between the mounting aperture 92 and the roller mounting aperture 94. The plates 84 are aligned with one another such that the mounting apertures 92 are aligned to provide a pair of mounting apertures 92, the roller mounting apertures 94 are aligned to provide a pair of roller mounting apertures 94, and the adjustment apertures 96 are aligned to provide a pair of adjustment apertures 96.

The brace 86 is generally rectangularly-shaped and extends between the inner surfaces 88 of the plates 84 and is generally perpendicular thereto. The brace 86 includes an upper surface 98 and a lower surface 100. The brace 86 is preferably secured to the plates 84 by welding.

The attachment member 82 generally includes a base member 102, first and second flanges 104, 106, a pair of inner gripping members 108a, 108b and a pair of outer gripping members 110a, 110b.

The base member 102, first flange 104 and second flange 106 are preferably integrally formed. A generally truncated V-shaped area 142 is formed by the base 102 and the flanges 104, 106, with the gripping members 108a, 108b, 110a, 110b being affixed to the flanges 104, 106 as shown.

The base member 102 is generally rectangularly-shaped and includes an upper end 112, a lower end 114, a first edge 116 and a second edge 118. The base member 102 extends from the lower surface 100 of the brace 86 and is generally perpendicular thereto. The upper end 112 of the base 102 is secured to the brace 86 preferably by welding. A post aperture 120 extends through the base 102 proximate the upper end 112 thereof.

The first flange 104 extends outwardly from the first edge 116 of the base member 102 and is angled relative thereto. The first flange 104 includes an upper end 122 secured to the brace 86 and a lower free end 124. One of the pair of outer gripping members 110a is mounted proximate the lower end of the flange 104 and one of the pair of inner gripping members 108a is mounted proximate the lower end 124 of the flange 104 and is spaced inwardly from the outer gripping member 110a toward the base 102. Each gripping member 110a, 108a is generally cylindrically-shaped and includes a plurality of radially extending ribs 130 along the length of the gripping member 110a, 108a. A rectangularly-shaped collar 105 extends outwardly from the flange 104. The collar 105 extends around the inner gripping member 108a and the outer gripping member 110a. Ali upper surface 107 of the collar 105 is proximate upper ends of the gripping members 110a, 108a; an outer surface 109 of the collar 105 is proximate the outer gripping member 110a; a lower portion 111 (see FIGS. 9 and 10) of the collar 105 is proximate the lower ends of the inner and outer gripping members 110a, 108a; and an inner surface 115 is proximate the inner gripping member 108a.

The second flange 106 extends outwardly from the first edge 118 of the base member 102 and is angled relative thereto. The second flange 106 includes an upper end 132 secured to the brace 100 and a lower free end 134. One of the pair of gripping members 110b is mounted proximate the lower end 134 of the flange 106 and a one of the pair of inner gripping members 108b is mounted proximate the lower end 134 of the flange 106 and spaced inwardly from the outer gripping member 110b toward the base 102. Each gripping member 110b, 108b is generally cylindrically-shaped and includes a plurality of outwardly extending ribs 130 along the length of the gripping member 110b, 108b. A rectangularly-shaped collar 117 extends outwardly from flange 106. The collar 117 extends around second inner gripping member 108b and second outer gripping member 110b. An upper surface 119 of the collar 117 is proximate upper ends of the gripping members 110b, 108b; an outer surface 121 of the collar 117 is proximate the outer gripping member 110b; a lower surface 123 of the collar 107 (see FIGS. 9 and 10) is proximate the lower ends of gripping members 110b, 108b; and an inner surface 125 is proximate the inner gripping member 108b.

The ribs 130 on the inner pair of gripping members 108a, 108b are preferably spaced such that 11½ ribs 130 are provided per inch (11½ tpi). The ribs 130 of the outer gripping members 110a, 110b are preferably spaced such that 8 threads/ribs are provided per inch (8 tpi).

As best shown in FIG. 4, the mounting member 80 is mounted to the elbow 48 of the cable puller 40 by placing the outer surfaces 90 of the triangularly-shaped plates 84 proximate the inner surfaces 67 of the plates 68 of the elbow 48. Next, the mounting apertures 92 of the plates 84 are aligned with the mounting apertures 74 of the plates 68 of the elbow 48 and ends of a roller 144 are mounted through the mounting apertures 74, 92 to secure the mounting member 80 to the elbow 48. The roller 144 provides an axis about which the mounting member 80 can be rotated to adjust the angle of the mounting member 80 relative to the elbow 48. The relative positions of the mounting member 80 and the elbow 48 are secured by passing a pin 142 through the adjustment apertures 72 of the plates 68 of the elbow 48 and through the adjustment apertures 96 through the plates 84 of the mounting member 80. A roller 145 is mounted in the roller mounting apertures 94 of the mounting member 80.

Figure 8:
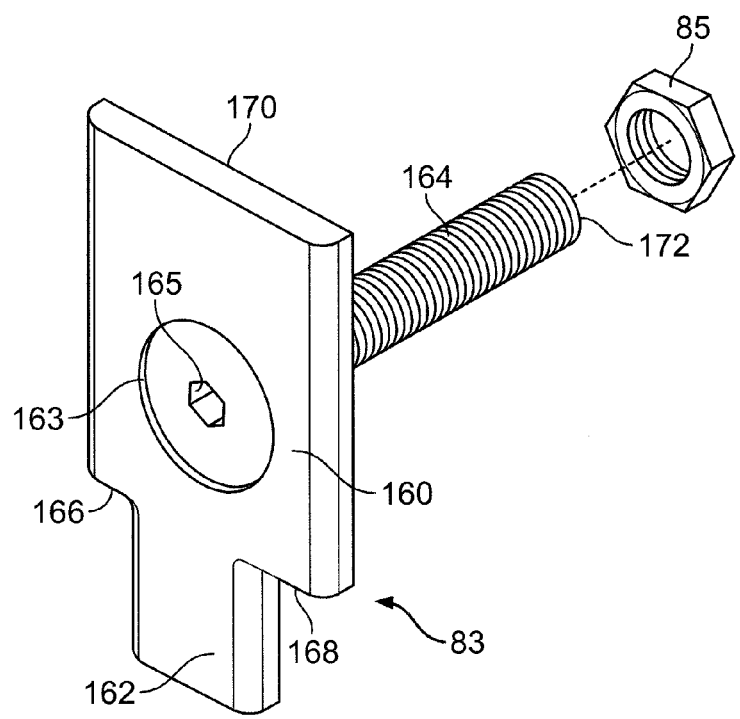
FIG. 8 is a perspective view of a portion of the adaptor of the attachment system.

As best shown in FIG. 8, the clamp 83 generally includes an upper portion 160, a lower portion 162, and a post 164. The upper portion 160 and the lower portion 162 are generally planar and rectangularly-shaped and generally form a T-shape. The lower portion 162 extends from the center of a lower edge of the upper portion 160. The lower portion 162 is narrower than the upper portion 162 such that abutments 166, 168 are provided by the upper portion 160. An aperture 163 is provided through the upper portion 160 of the clamp 83. The post 164 is provided within the aperture 163 such that a head of the post 164 is retained within the aperture and a body of the post 164 extends perpendicularly from a rear surface 170 of the upper portion 160. A free end 172 is provided by the body of post 164. A recess 165 is provided in the head of the post 164. A thread is provided along the outer surface of the body of the post 164.

Figure 5:
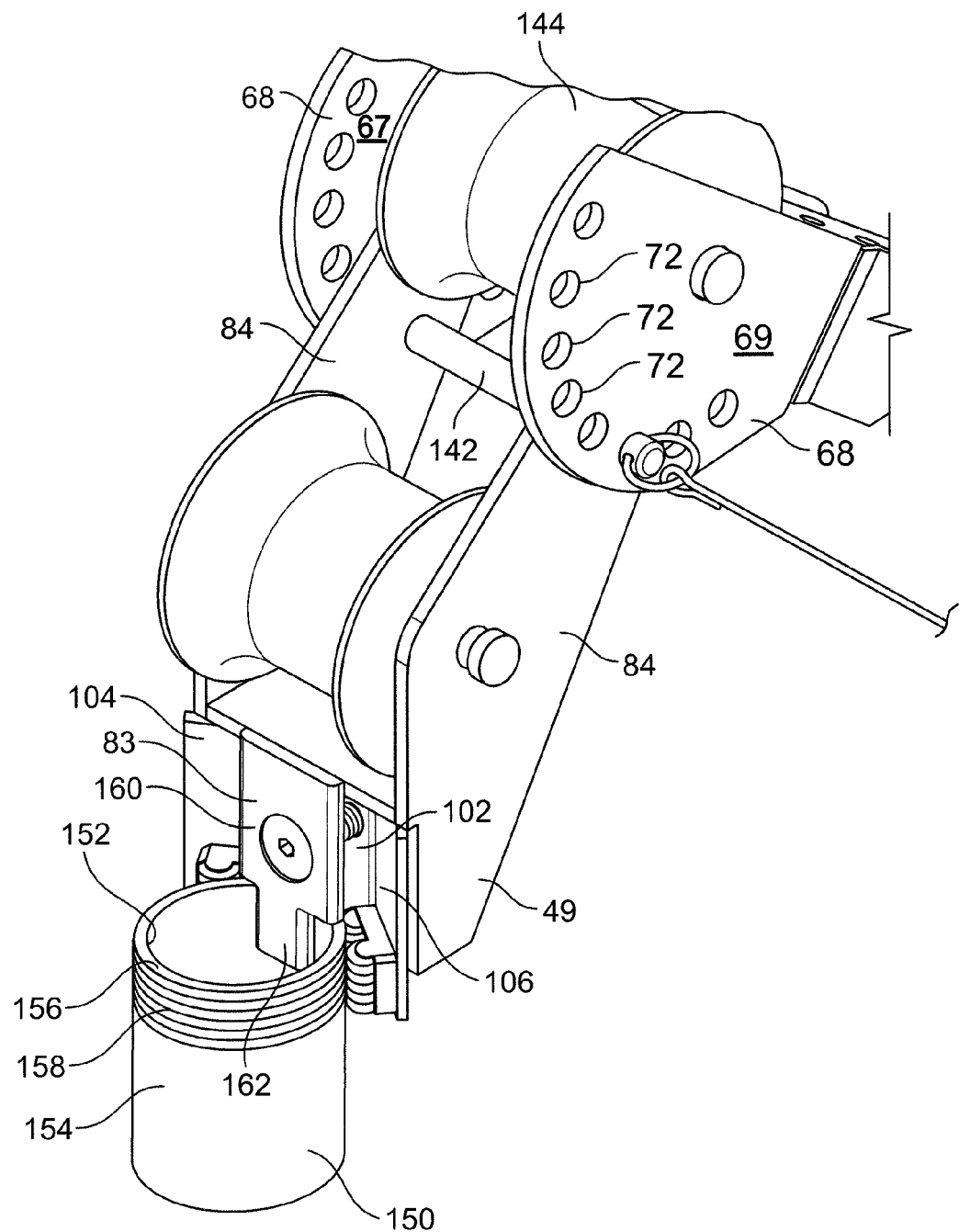
FIG. 5 is a detailed perspective view of the attachment system of the present invention and a portion of the cable puller on which the attachment system is mounted.
Figure 6:
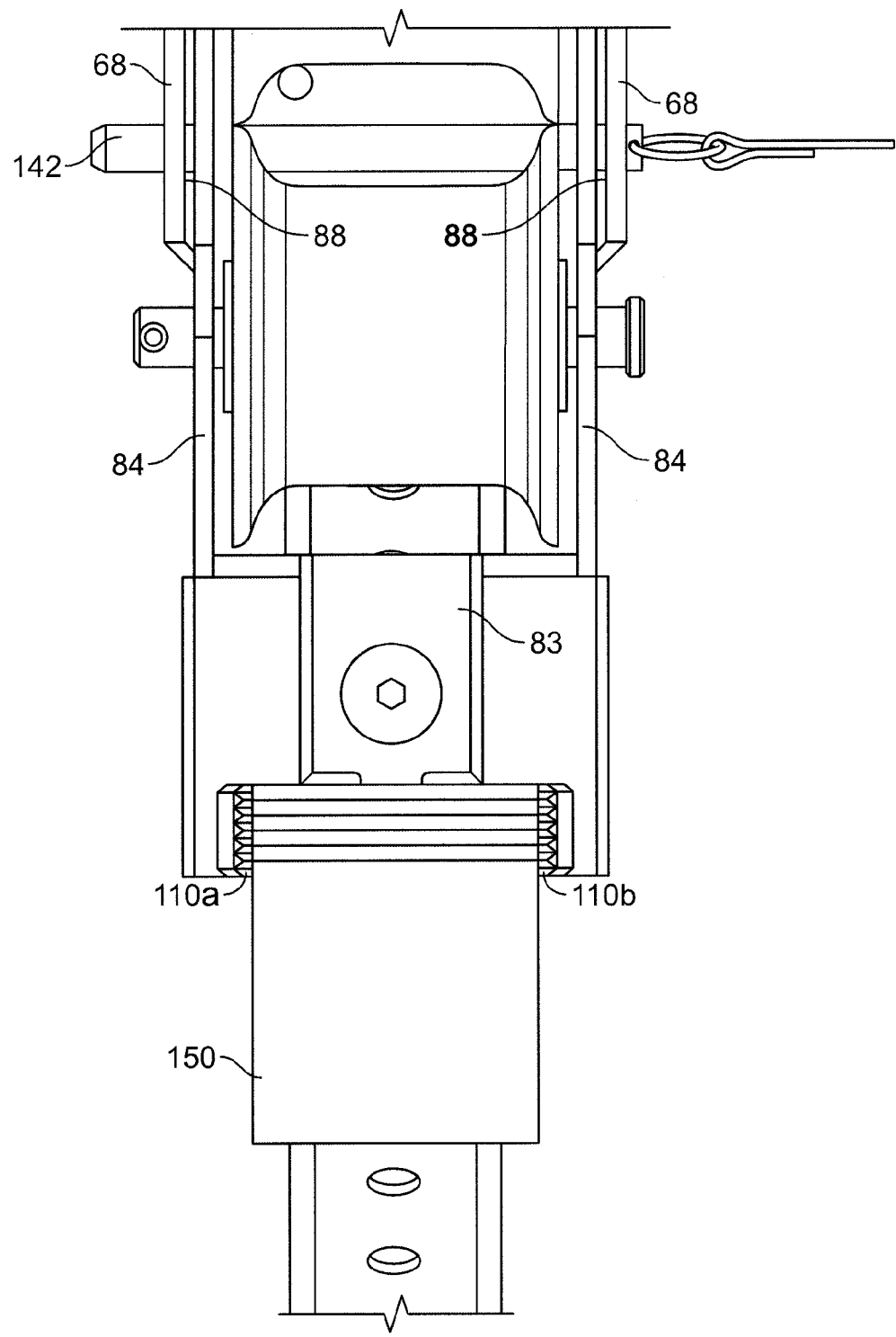
FIG. 6 is a front elevational view of the attachment system of FIG. 5 and a portion of the cable puller on which the attachment system is mounted.
Figure 9:
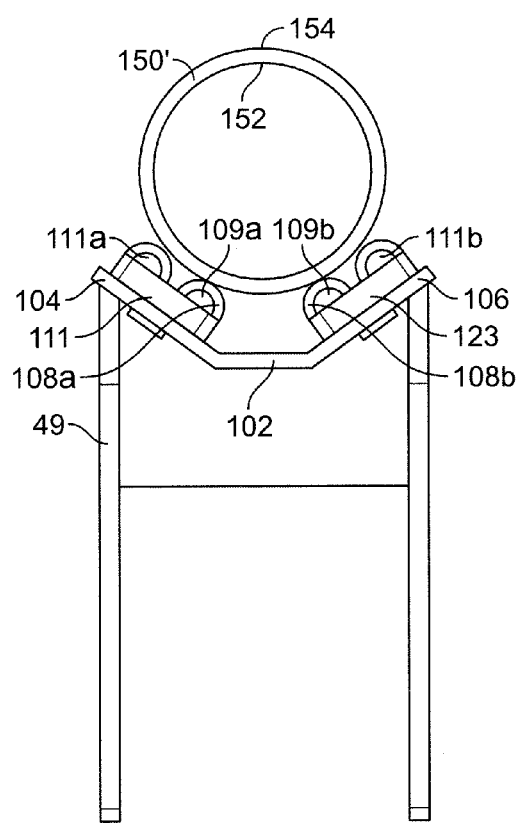
FIG. 9 is a bottom plan view of a portion of the adaptor of the attachment system with a conduit having a relatively smaller diameter mounted thereto.
Figure 10:
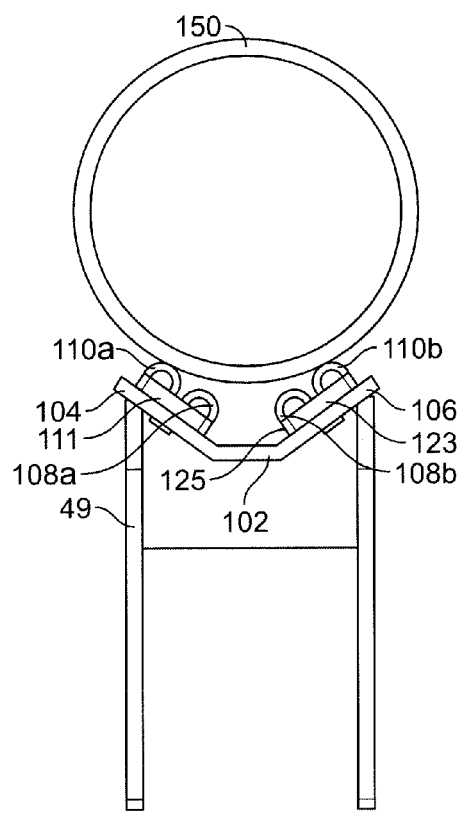
FIG. 10 is a bottom plan view of a portion of the adaptor of the attachment system with a conduit having a relatively large diameter mounted thereto.

A stationary conduit 150 mounted in a wall (not shown) to which the adaptor 49 is secured and through which a cable is to be pulled is shown in FIGS. 5, 6 and 10. As best shown in FIG. 5, the conduit 150 is generally cylindrically-shaped and includes an inner surface 152, an outer surface 154, and an end surface 156. A plurality of threads 158 are provided on the outer surface 154 of the conduit 150. The adaptor 49 is attached to the conduit 150 by placing the conduit 150 in the truncated V-shaped area 142 formed by the attachment member 82. The post 164 of the clamp 83 is passed through the post aperture 120 of the base member 102 and a nut 85 is threaded to the free end 172 of the post 164. The clamp 83 is positioned such that the second portion 162 of the clamp 83 extends into the conduit 150 and the abutment surfaces 166, 168 of the clamp 83 abut an end surface 156 of the conduit 150. The nut 85 is then rotated to draw the clamp 83 closer to the base member 102 thereby gripping the conduit 150 between the clamp 83 and the attachment member 82. A conduit 150' having a relatively smaller diameter is shown in FIG. 9.

As best shown in FIG. 9, when the adaptor 49 is mounted to a conduit 150' having a smaller diameter, for example a diameter of two inches or less, the conduit 150' rests against the inner gripping members 108a, 108b and the threads 158 of the conduit 150' nest within the threads 130 of the gripping member 108a, 108b. As shown in FIG. 10, when the adaptor 49 is mounted to a conduit 150 having a larger diameter, for example, a diameter of greater than two inches, the conduit 150 rests against the outer gripping members 110a, 110b and the threads 158 of the conduit 150' nest within the threads 130 of the gripping members 110a, 110b.

As shown in the drawings, the adaptor 49 is attached to a free standing conduit 150, 150' however, in some instances, a conduit nut (not shown) is threaded to the end of the conduit 150, 150' and is spaced from the end surface 156 of the conduit 150, 150'. In these instances, the lower surfaces 109a, 109b, 111a, 111b of the gripping members 108a, 108b, 110a, 110b may abut the conduit nut.

In addition to providing attachment between the cable puller 40 and the conduit 150, 150', the adaptor 49 provides a mechanism for transferring forces from the puller 40 to the conduit 150, 150' as the cable is pulled through the conduit 150, 150'. As cable is pulled through the conduit 150, 150', forces from the puller 40 are transferred from the puller 40, to the clamp 83 and to the conduit 150, 150' by way of the abutting edges 168 of the clamp 83, or in the event a conduit nut is provided, by way of the lower surfaces 109a, 109b, 111a, 111b of the gripping members 108a, 108b, 110a, 110b.

Thus, it can be seen that the adaptor 49 can accommodate conduits 150 of varying diameter. Because varying sized conduits 150 can be accommodated by the adaptor 49, the user does not need to have a plurality of adaptors 49 to accommodate different sized conduits 150. In addition, the puller 40 can be mounted to various conduits without requiring the adaptor 49 to be removed and a new adaptor mounted. Therefore, setup time is reduced.

As the attachment system including the adaptor 49 only has two contact points on one side of the conduits (the inner gripping members 108a, 108b on the conduit 150' and the outer gripping members 110a, 110b on the conduit 150), the attachment system does not provide the load bearing capacity and torsional stiffness needed for higher force pulling, e.g., up to 4000 pounds force. Thus, the attachment system 202 which incorporates the features of a second embodiment of the invention is provided, as illustrated in FIGS. 11-22, which provides the load bearing capacity and torsional stiffness needed for higher force pulling. As will be discussed hereinbelow, the attachment system 202 achieves this by providing for a greater number of gripping/contact points which distributes load better and creates better stability due to the contact points being distributed around the entire conduit diameter. In the process of pulling, the cable/rope will generally pass within the boundary formed by the contact points in order to prevent any torque reaction to the pulling apparatus due to an offset load. Additionally, there is no intrusion into the inside diameter of the conduit by a clamp.

Figure 11:
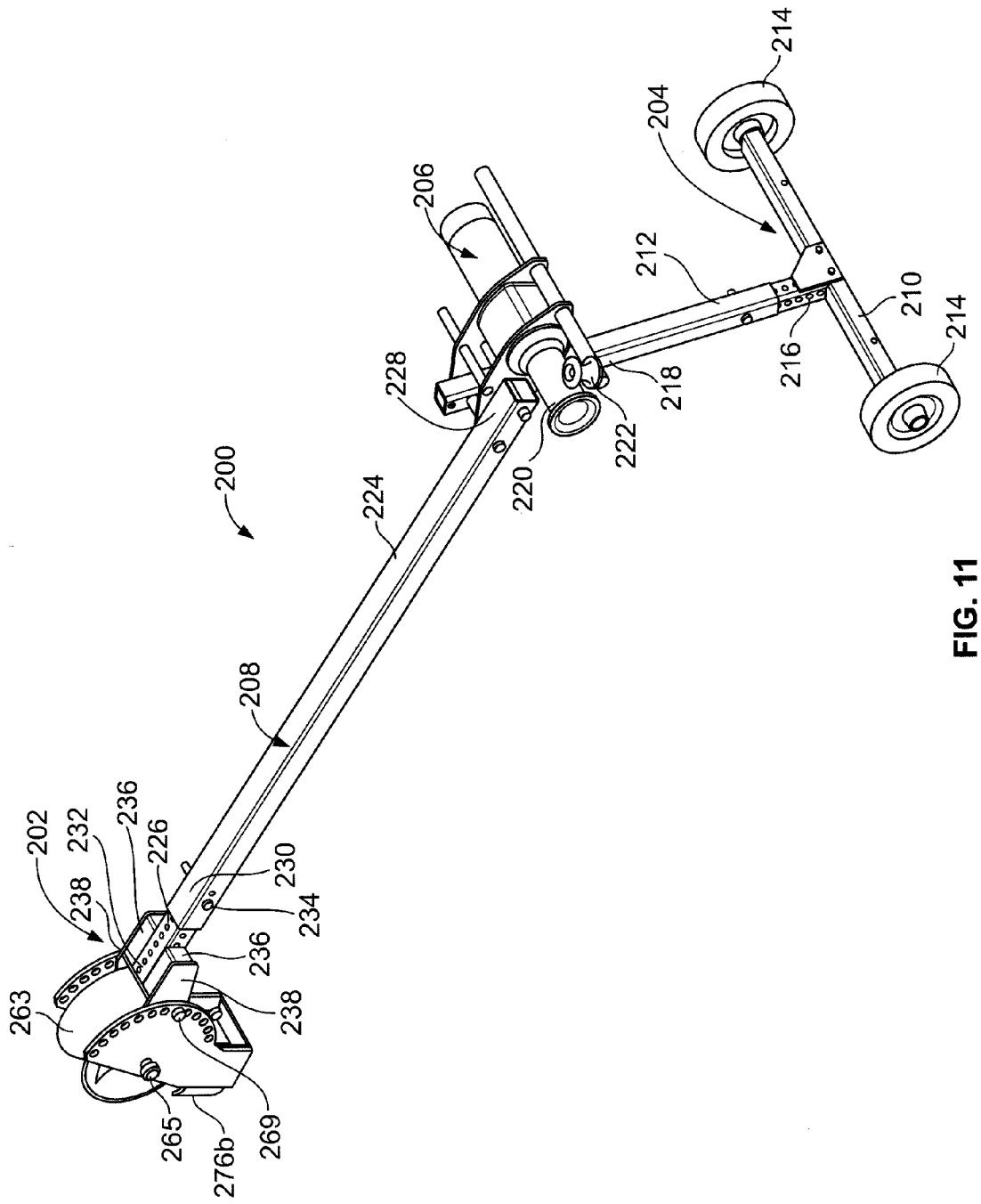
FIG. 11 is a perspective view of a cable puller with the attachment system incorporating features of a second embodiment of the present invention mounted thereto.
Figure 12:
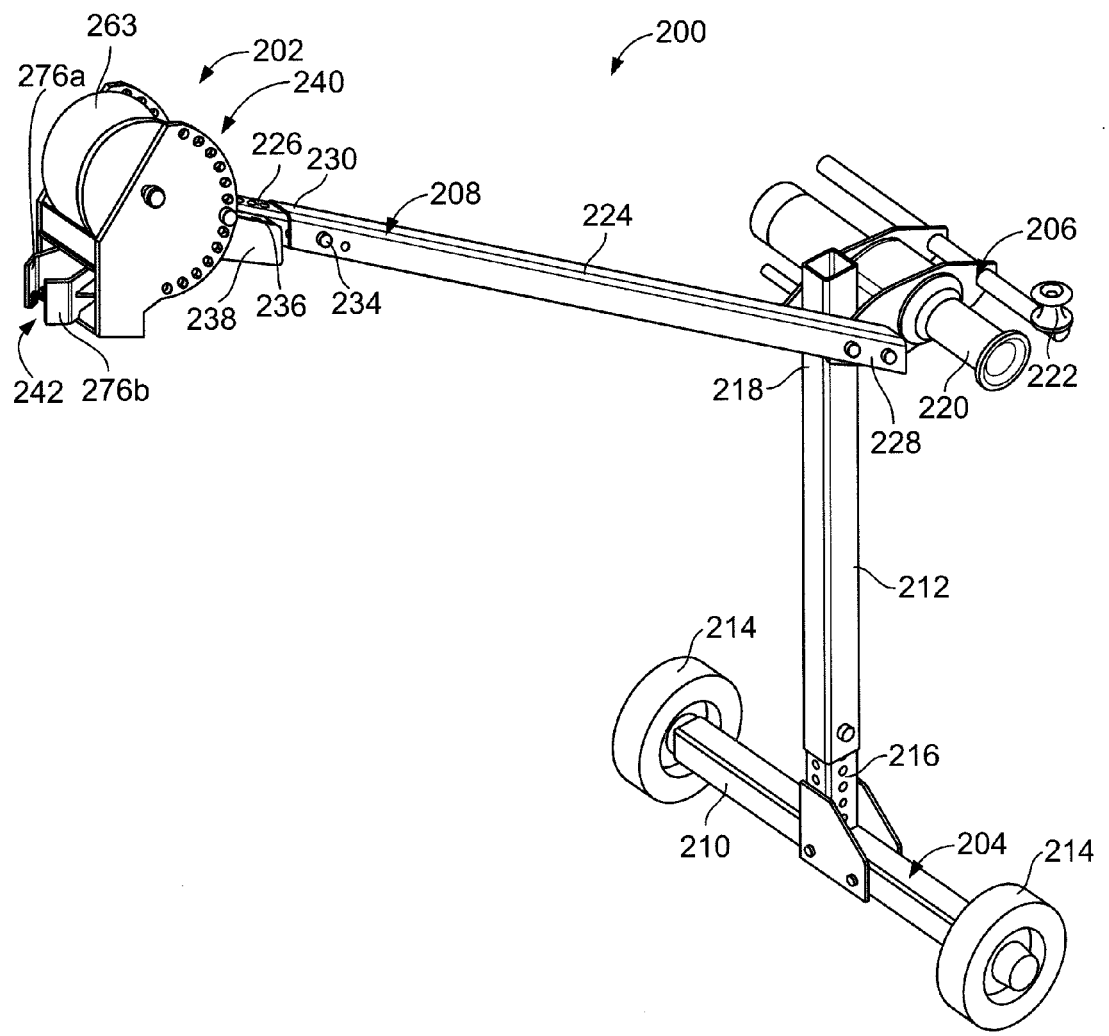
FIG. 12 is an alternative perspective view of the cable puller illustrated in FIG. 11.

The attachment system 202 along with a cable puller 200 is shown in FIGS. 11 and 12. The cable puller 200 generally includes a base 204, a puller assembly 206, a telescoping boom 208 extending from the puller assembly 206 and the attachment assembly 202.

The base 204 generally includes a horizontal portion 210 and a vertical portion 212 extending upwardly therefrom. Wheels 214 are provided proximate opposite ends of the horizontal portion 210 for transportation of the cable puller 200. The vertical portion 212 is elongated and includes a lower end portion 216 and an upper end portion 218. The lower end portion 216 is secured to the horizontal portion 210, proximate the center thereof. The upper end portion 218 is secured to the puller assembly 206.

The puller assembly 206 includes a capstan 220 about which the cable to be pulled is wound and a roller 222 for guiding the cable. The puller assembly 206 allows for adjustment of the angle between the base 204 and the boom 208.

The telescoping boom 208 includes an outer member 224 and an inner member 226. The outer member 224 has a first end portion 228 and a second end portion 230 and is formed from elongated side walls which form a square cross-section. Apertures are provided through opposite side walls of the outer member 224. The first end portion 228 of the outer member 224 is secured to the puller assembly 206. The second end portion 230 of the outer member 224 receives the inner member 226. The inner member 226 also has a first end portion (not shown) and a second end portion 232 and is also formed from elongated side walls which form a square cross-section. Apertures are provided through opposite side walls of the inner member 226. The perimeter of the inner member 226 is smaller than the perimeter of the outer member 224 to allow the inner member 226 to be positioned within the outer member 224, such that the first end portion thereof is positioned within the outer member 224 and such that the second end portion 232 is positioned outside of the outer member 224. The inner member 226 is slidable relative to the outer member 224 to extend or reduce the effective length of the boom 208. Apertures through the inner member 206 are aligned with apertures of the outer member 204 and a pin 234 is passed through the aligned apertures to secure the relative positions of the inner and outer members 224, 226 of the boom 208. It is to be understood that the cross-section of the inner and outer members 224, 226 may be of a shape other than square.

The attachment system 202 includes a pair of width-extension members 236, a pair of bracket plates 238, an adjustable elbow mounting member 240, and a clamping assembly 242.

The width-extension members 236 are secured, by any appropriate means, such as by welding, to opposite side walls of the inner member 226 proximate to the second end 232, and preferably extend to be flush with the second end 232 of the inner member 226. The width-extension members 236 are preferably in the form of blocks which may be solid or hollow in configuration as desired. The width-extension members 236 prevent the inner member 226 from extending all the way into the outer member 224 because the width-extension members 236 are wider than the opening of the outer member 224.

Figure 22:
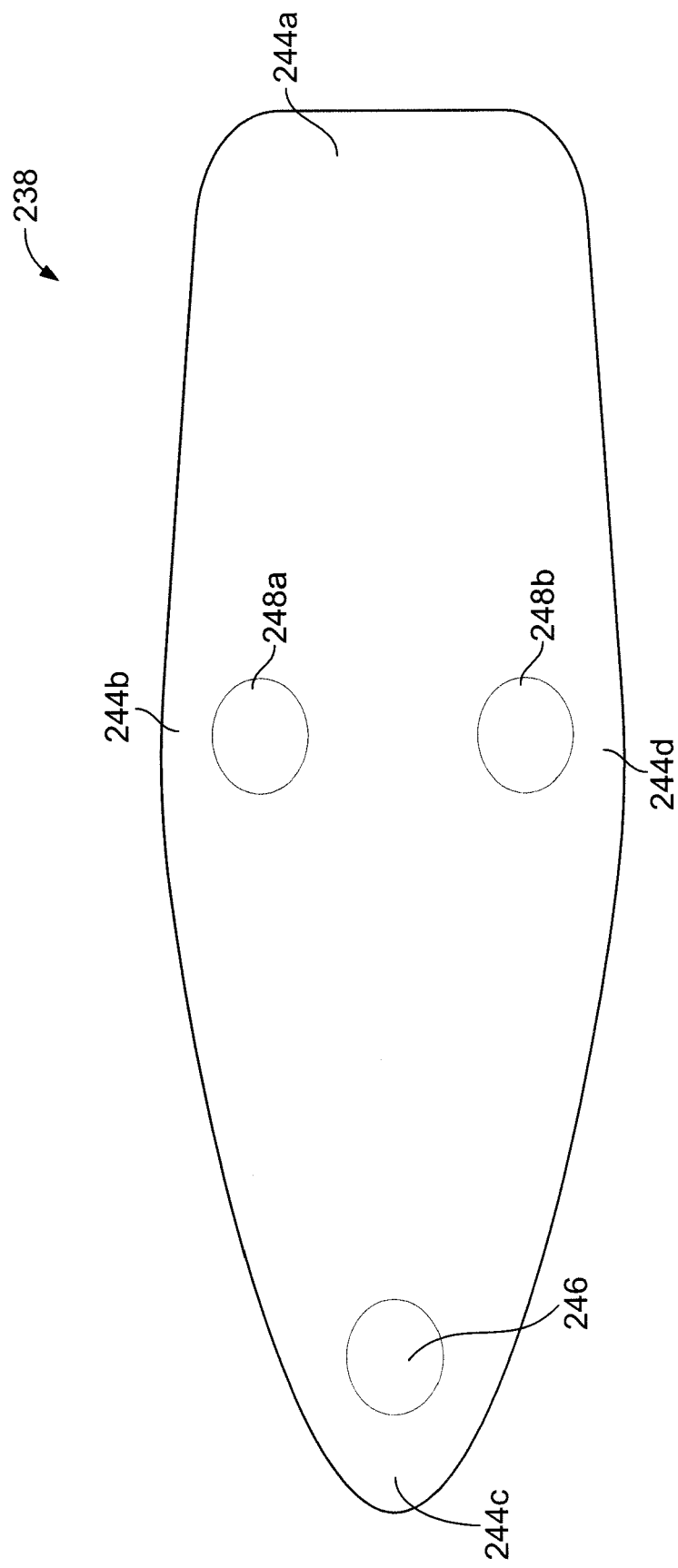
FIG. 22 is a side elevational view of a bracket plate of the attachment system.

As best illustrated in FIG. 22, the bracket plates 238 are generally diamond-shaped such that each generally has first, second, third and fourth corner portions 244a, 244b, 244c, 244d. The first and third corner portions 244a, 244c are positioned opposite one another and the second and fourth corner portions 244b, 244d are positioned opposite one another. Each bracket plate 238 is narrower from the second and fourth corner portions 244b, 244d than from the first and third corner portions 244a, 244c. Each plate 238 is secured to one of the width-extension members 236 at the first corner portions 244a by any appropriate means, such as welding, such that the plates 238 are parallel, yet spaced apart from one another and such that the second, third and fourth corner portions 244b, 244c, 244d of the plates 238 all extend beyond the second end 232 of the inner member 226. Each plate 238 also includes a mounting aperture 246 and first and second adjustment apertures 248a, 248b. The mounting aperture 246 is provided through the third corner portion 244c. The first adjustment aperture 248a is provided through the second corner portion 244b and the second adjustment aperture 248b is provided through the fourth corner portion 244d.

Figure 18:
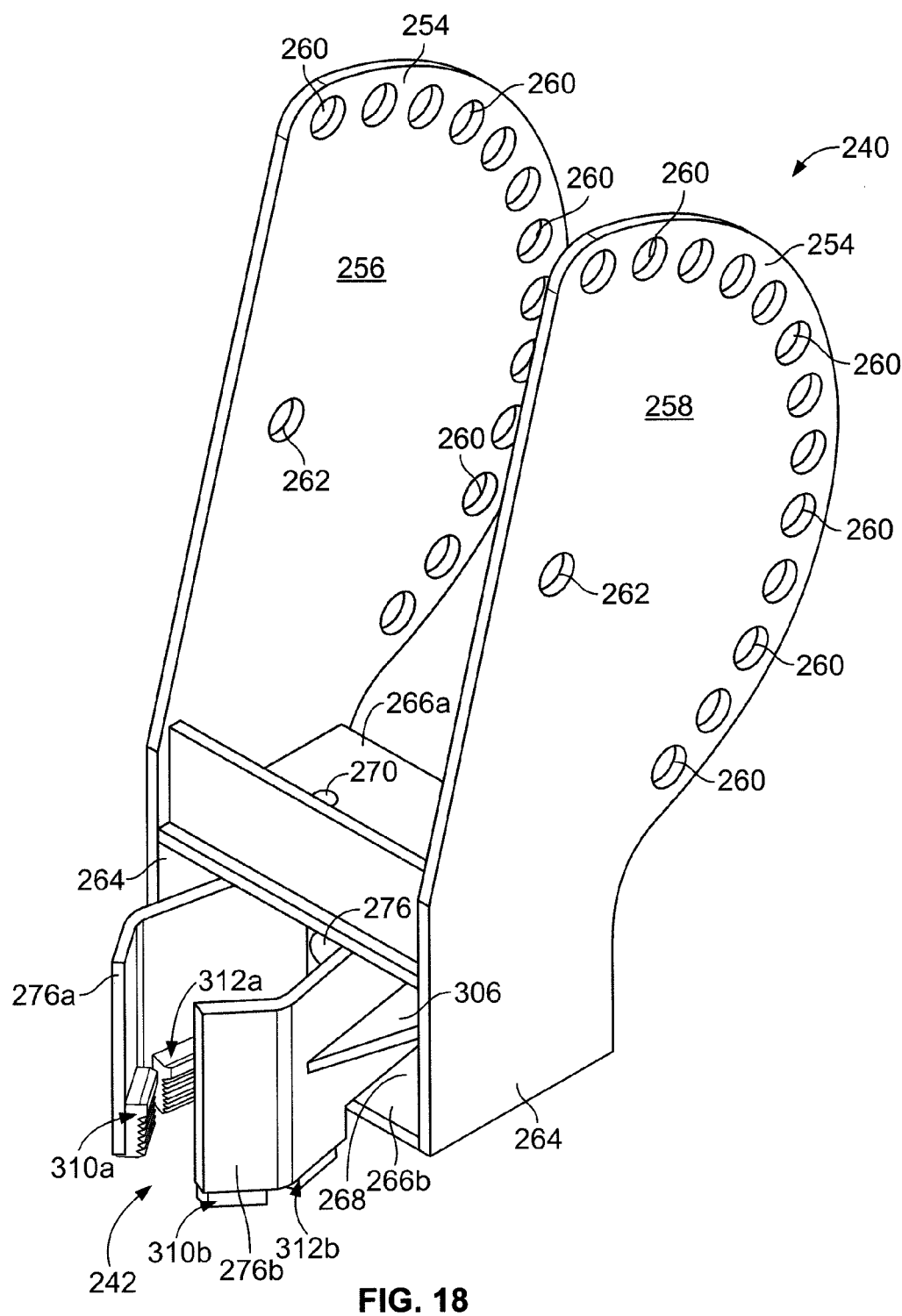
FIG. 18 is a perspective view of an adjustable elbow mounting member and a clamping assembly of the attachment system.

As best illustrated in FIG. 18, the adjustable elbow mounting member 240 includes two semi-circular plates 254 which are parallel and spaced from each other. Each plate 254 includes an inner surface 256 and an outer surface 258. A plurality of spaced apart adjustment apertures 260 are provided along the circumference of the plates 254 and a mounting aperture 262 is provided at the radial center of each plate 254. When the semi-circular plates 254 are mounted to the bracket plates 238, the inner surfaces 256 of the semi-circular plates 254 are secured to the bracket plates 238 and the mounting apertures 246 of the bracket plates 238 are aligned with the mounting apertures 262 of the semi-circular plates 254.

Figure 13:
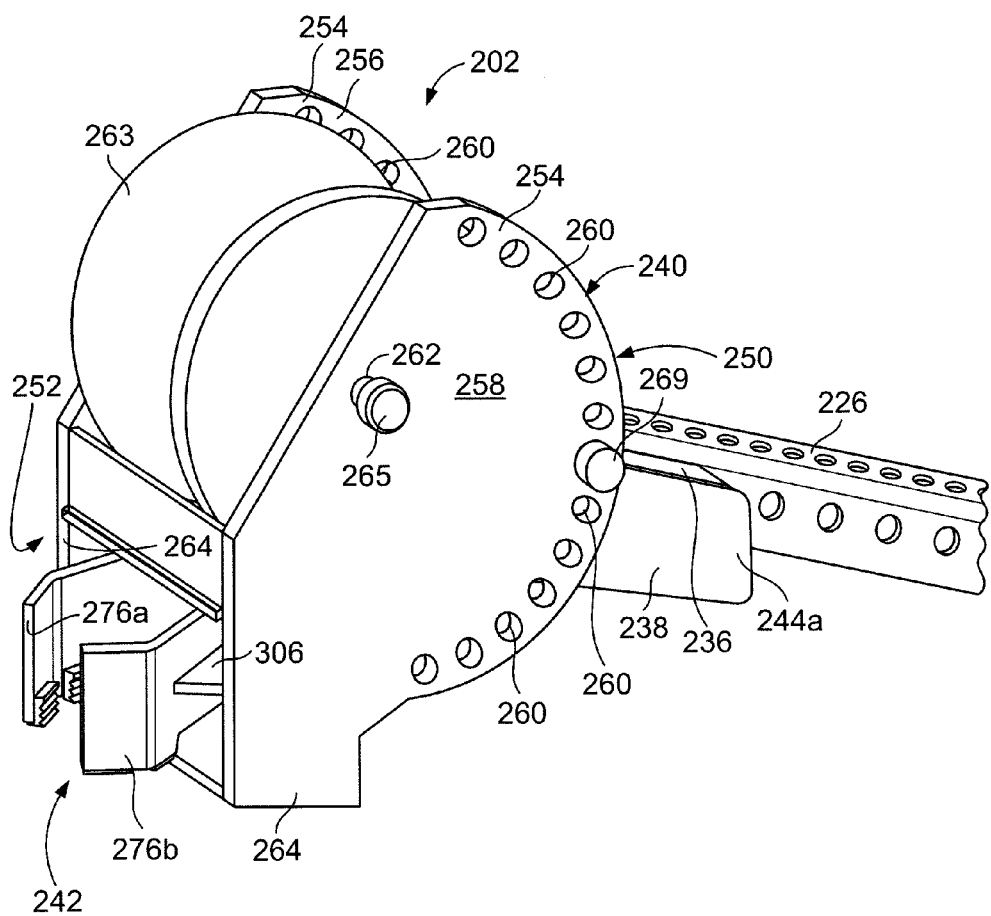
FIG. 13 is a perspective view of a portion of the cable puller and the attachment system of FIG. 12.
Figure 14:
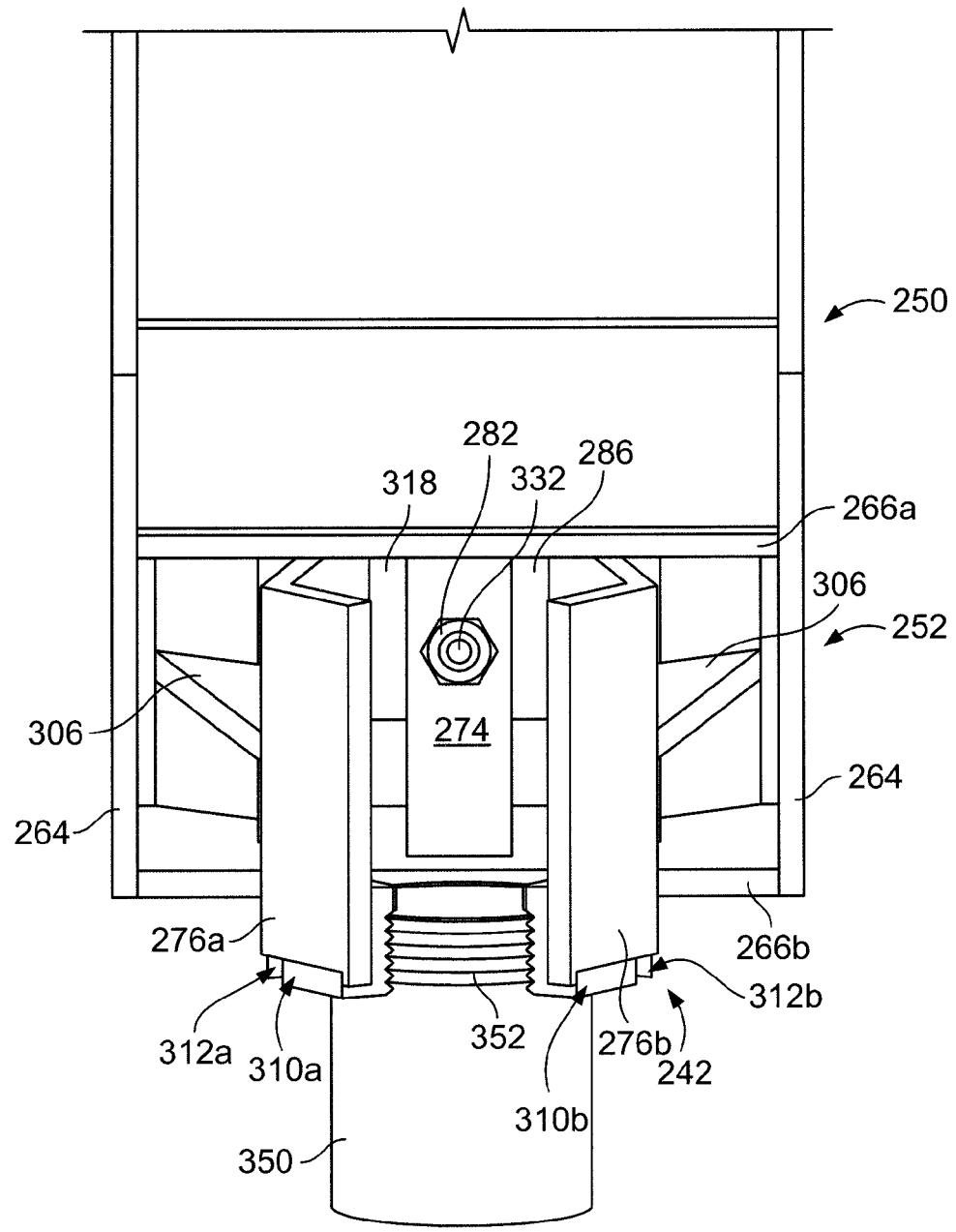
FIG. 14 is a front view of the attachment system securing a conduit thereto.
Figure 15:
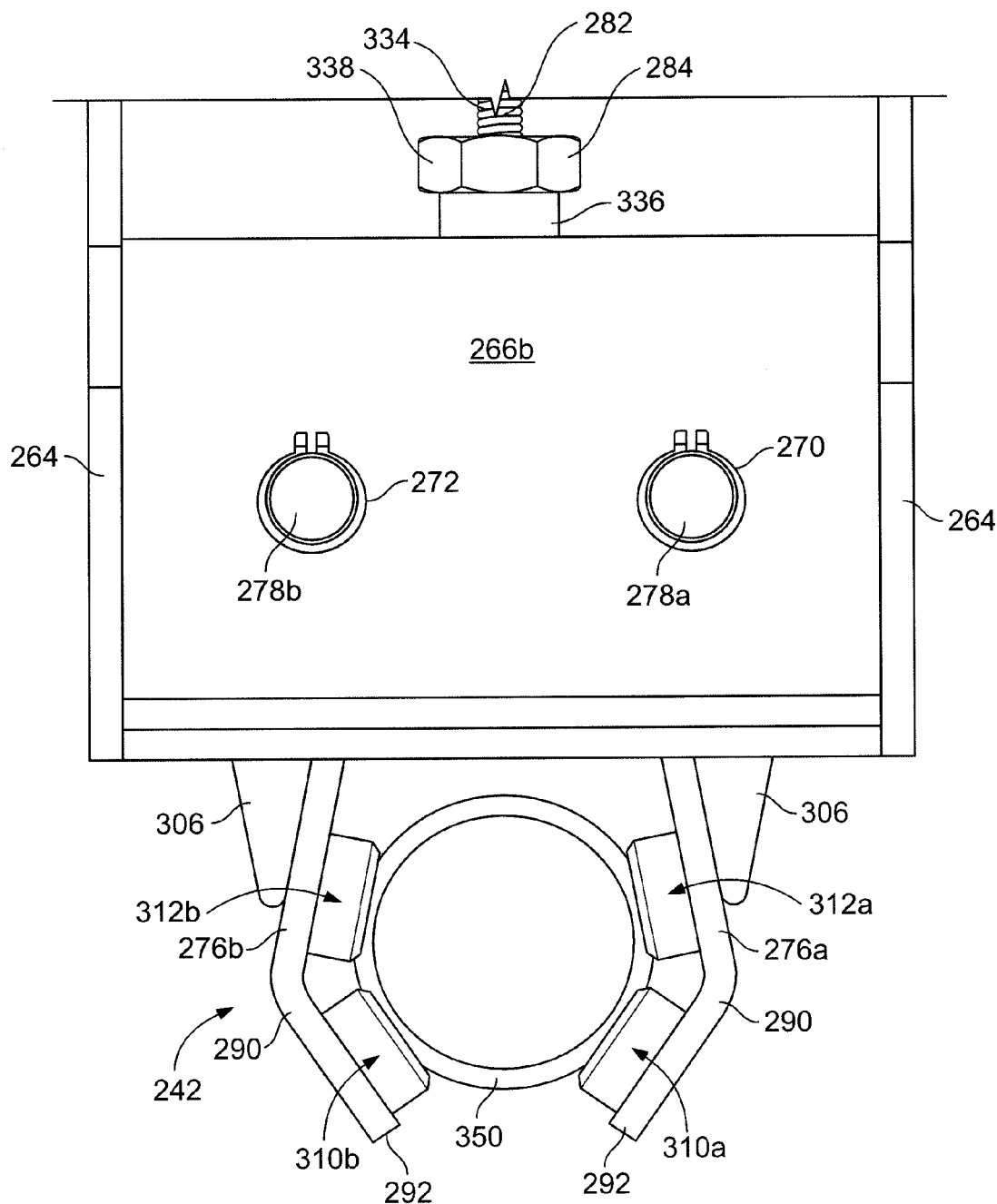
FIG. 15 is a bottom view of the attachment system securing the conduit thereto.
Figure 16:
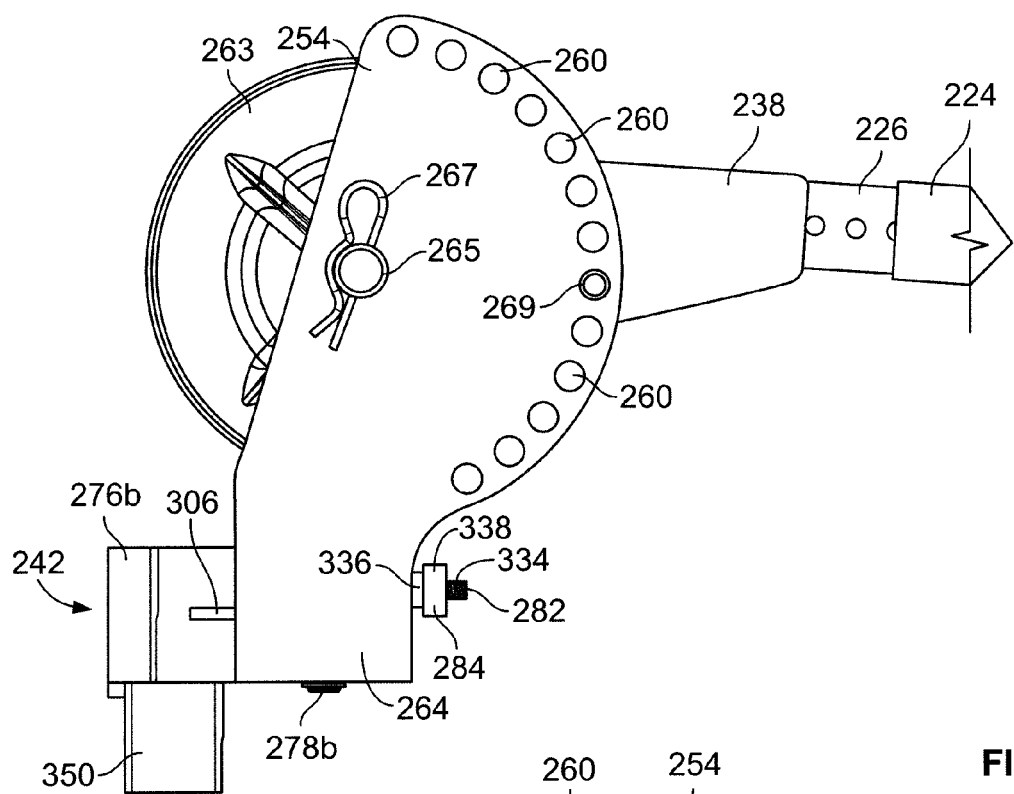
FIG. 16 is a first side view of the attachment system securing the conduit thereto and a portion of the cable puller on which the attachment system is mounted.
Figure 17:
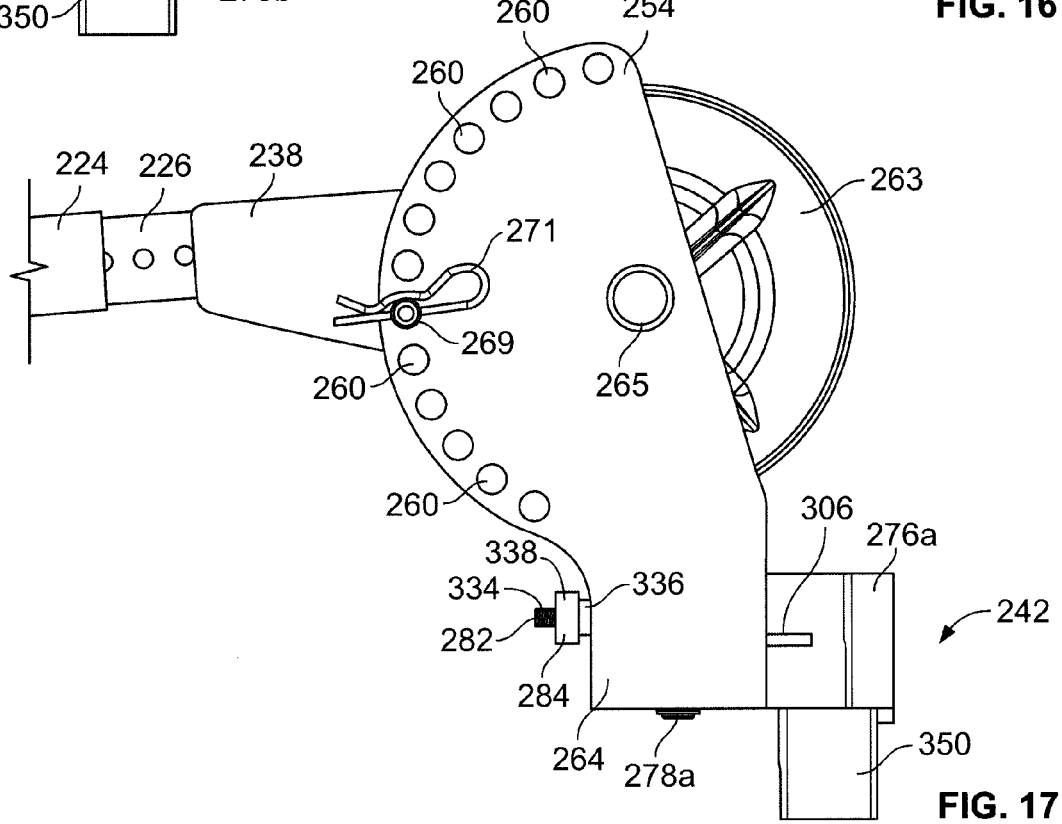
FIG. 17 is a second side view of the attachment system securing the conduit thereto and a portion of the cable puller on which the attachment system is mounted.

A roller 263, FIG. 13, is mounted between the bracket plates 238 and the two semi-circular plates 254 of the adjustable elbow mounting member 240. A shank of a pin 265 extends through the mounting aperture 262 of one of the two semi-circular plates 254, through the mounting aperture 246 of one of the two bracket plates 238, through the roller 263, through the mounting aperture 246 of the other one of the two bracket plates 238, and through the mounting aperture 262 of the other one of the two semi-circular plates 254. A head of pin 265 bears against the outer surface 258 of one of the two semi-circular plates 254. The shank of the pin 265 is secured in position by known means, such as, for example, a cotter pin 267.

A shank of a pin 269 is also positioned to extend through one of the adjustment apertures 260 of one of the two semi-circular plates 254, through one of the adjustment apertures 248a, 248b of one of the two bracket plates 238, through the corresponding adjustment aperture 248a, 248b of the other one of the two bracket plates 238, and through the corresponding adjustment aperture 260 of the other one of the two semi-circular plates 254. A head of pin 269 bears against the outer surface 258 of one of the two semi-circular plates 254. The shank of the pin 269 is secured in position by known means, such as, for example, a cotter pin 271. Because of the plurality of adjustment apertures 260 through the semi-circular plates 254 and because of the two adjustment apertures 248a, 248b through the bracket plates 238, the adjustable elbow mounting member 240 may be secured to the boom 208 in a plurality of different positions relative to the boom 208. It should be noted that when pin 269 is used in conjunction with the first adjustment aperture 248a of the bracket plate 238 that the second adjustment aperture 248b will be located between any two of the adjustment apertures 260 of the semi-circular plates 254. Thus, depending on which adjustment aperture 248 of the bracket plate 238 is being used, the angle of the mounting member 240 relative to the boom 208 can be changed in half the increment established by the relative spacing of the adjustment apertures 260 of the semi-circular plates 254. This provides the user with greater flexibility when attempting to attach the mounting member 240 to conduit 350 in the field.

The adjustable elbow mounting member 240 includes a brace 264 extending downwardly from each semi-circular plate 254, and are preferably integrally formed with the two semi-circular plates 254. The braces 264 are planar with the respective semi-circular plates 254 and are generally rectangular in shape. Upper and lower connecting members 266a, 266b, which are generally rectangular in configuration, connect the braces 264 to each other. The upper connecting member 266a is provided proximate to or at the connection of the semi-circular plates 254 and the braces 264 and the lower connecting member 266b is provided at free ends of the braces 264 such that the upper and lower connecting members 266a, 266b are parallel to one another and spaced apart from one another. An aperture 268 is defined between the braces 264 and the upper and lower connecting members 266a, 266b. Each of the upper and lower connecting members 266a, 266b has first and second apertures 270, 272 which extend therethrough and which are separated from one another. The first apertures 270 of the upper and lower connecting members 266a, 266b are in alignment with one another and the second apertures 272 of the upper and lower connecting members 266a, 266b are in alignment with one another.

The clamping assembly 242 includes a stabilizer 274, first and second clamping arms 276a, 276b, first and second pivot pins 278a, 278b, and an adjustment assembly 280 including a fastening member 282, a securing member 284 and a push block 286.

The stabilizer 274 is generally rectangular in configuration and connects the upper connecting member 266a to the lower connecting member 266b. The stabilizer 274 connects to a lower surface of the upper connecting member 266a between the first and second apertures 270, 272 and connects to an upper surface of the lower connecting member 266b between the first and second apertures 270, 272. The stabilizer 274 has an aperture 277 extending therethrough from a front face thereof to a rear face thereof. The stabilizer 274 is thus positioned generally perpendicular relative to the upper and lower connecting members 266a, 266b.

Figure 20:
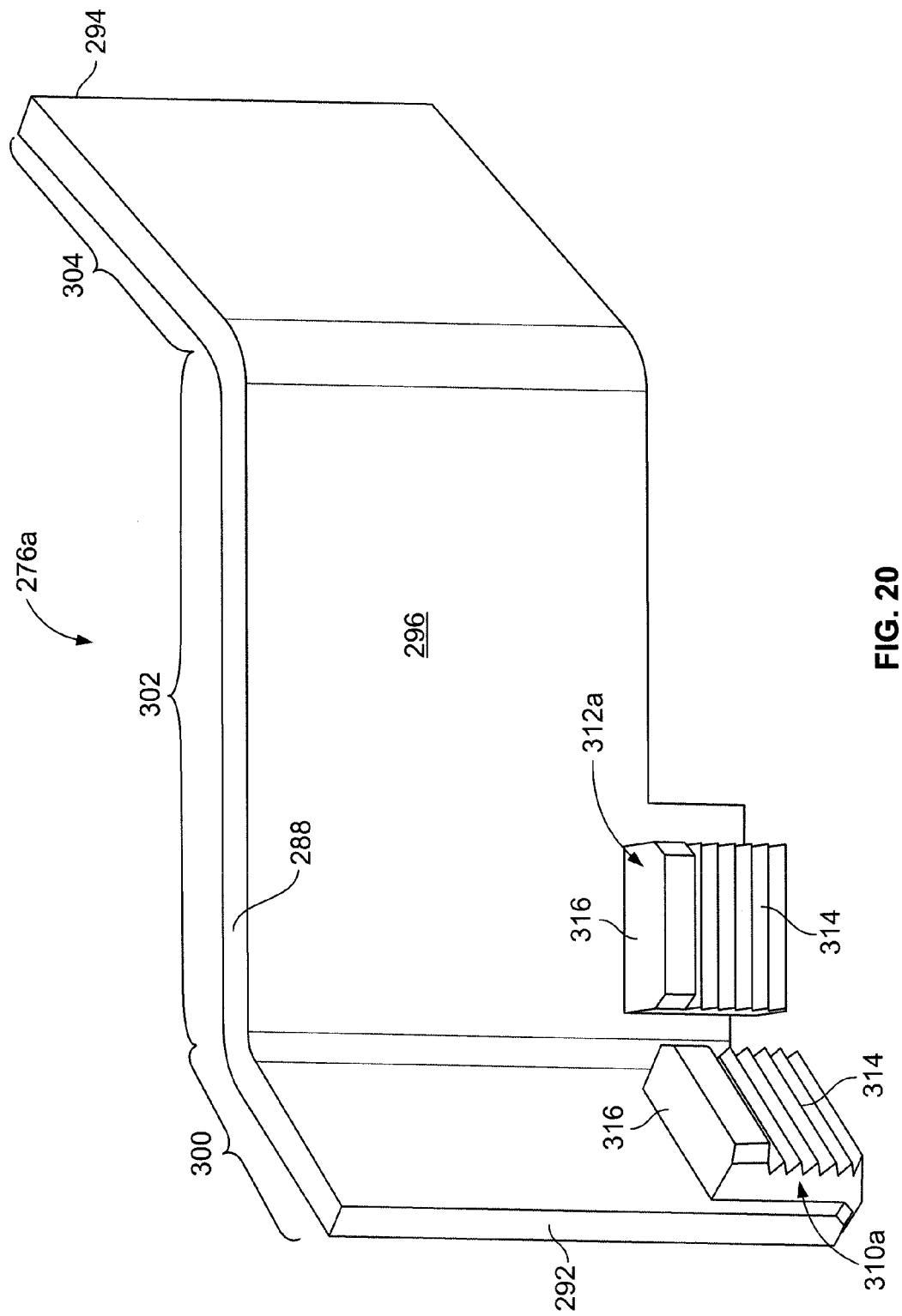
FIG. 20 is a perspective view of one of the clamping arms of the clamping assembly.

As best illustrated in FIG. 20, each clamping arm 276a, 276b has top and bottom edges 288, 290, front and rear edges 292, 294, inner and outer surfaces 296, 298, and first, second and third portions 300, 302, 304. The first portions 300 extend from the front edges 292 rearwardly to the second portions 302. The second portions 302 extend from the first portions 300 rearwardly to the third portions 304. The third portions 304 extend from the second portions 302 rearwardly to the rear edges 294. The second portions 302 are angled relative to the first and third portions 300, 304 with the first and third portions 300, 304 being parallel to one another. Thus, the inner surface 296 of the first and second portions 300, 302 are angled to form a generally V-shape and the outer surface of second and third portions 302, 304 are angled to form in a generally V-shape. The top edge 288 is generally planar from the front edge 292 to the rear edge 294 while the bottom edge 290 is stepped at the second portion 302 such that a shoulder 305 is provided.

Figure 21:
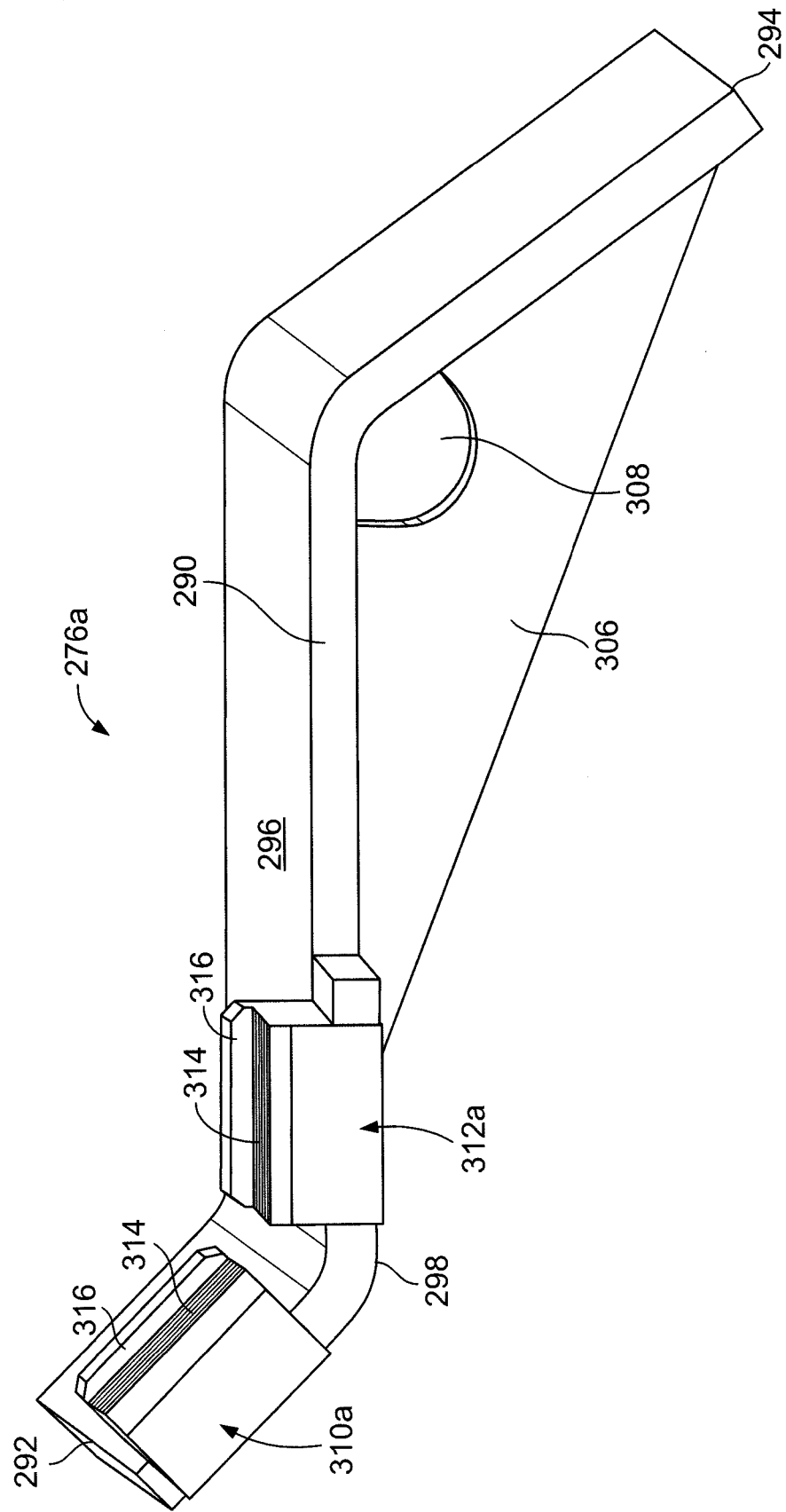
FIG. 21 is an alternative perspective view of one of the clamping arms of the clamping assembly.

Each clamping arm 276a, 276b has a generally triangular flange member 306, FIG. 21, extending outwardly from the outer surface 298 of the second and third portions 302, 304 between the top and bottom edges 288, 290 thereof. An aperture 308 is formed between the flange member 306 and the connection of the second and third portions 302, 304.

Each clamping arm 276a, 276b also has first and second gripping members 310a, 310b; 312a, 312b. The first gripping members 310a, 310b are secured to the bottom edge 290 and the inner surface 296 of the first portion 300. The second gripping members 312a, 312b are secured to the bottom edge 290 (between the connection of the first and second portions 300, 302 and the step of the bottom edge 290) and the inner surface 296 of the second portion 302. Each gripping member 310a, 310b; 312a, 312b is serrated such that a plurality of inwardly extending ribs 314 are provided along the length thereof. Each gripping member 310a, 310b; 312a, 312b also includes an overhang portion 316 provided above the ribs 314 which extends further inwardly from the inner surface 296 than do the inwardly extending ribs 314.

The first and second clamping arms 276a, 276b are secured in place within the aperture 268 of the adjustable elbow mounting member 240 by the first and second pivot pins 278a, 278b, respectively. The first pivot pin 278a is secured within the first aperture 270 of the lower connecting member 266b, the aperture 308 of the first clamping arm 276a, and the first aperture 270 of the upper collecting member 266a. Likewise, the second pivot pin 278b is secured within the second aperture 272 of the lower connecting member 266b, the aperture 308 of the second clamping arm 276b, and the second aperture 272 of the upper connecting member 266a. The first and second clamping arms 276a, 276b are positioned such that their inner surfaces 296 face one another, and such that the first and second gripping members 310a, 310b; 312a, 312b are in a generally facing relationship. The stabilizer 274 is between the second portions 302 of the clamping alms 276a, 276b proximate to the connection of the second and third portions 302, 304. The gripping members 310a, 310b; 312a, 312b may be moved toward one another or away from one another by the adjustment assembly 280.

Figure 19:
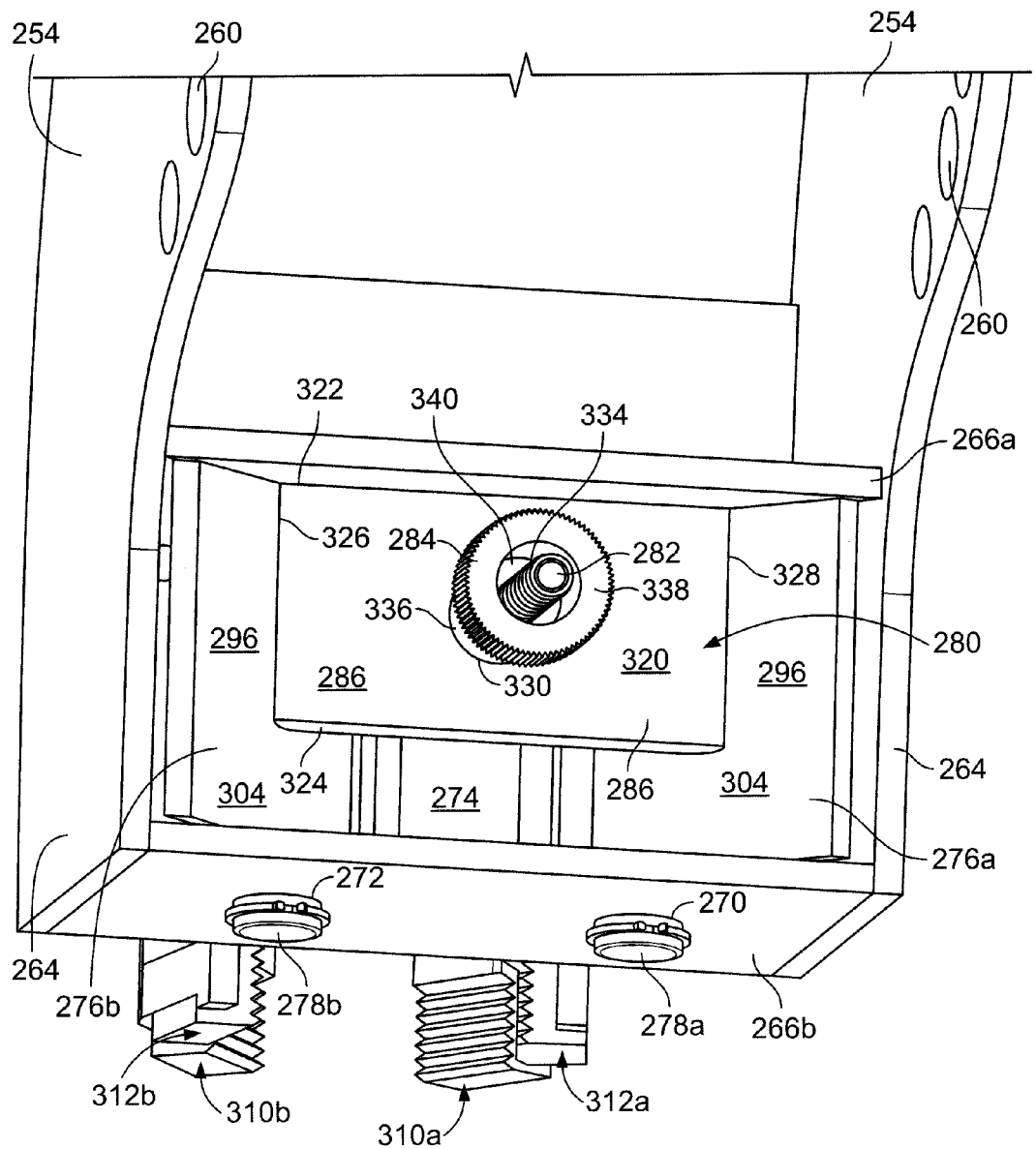
FIG. 19 is a perspective view of a portion of the adjustable elbow mounting member and the clamping assembly of the attachment system.

As best shown in FIGS. 19 and 24, the push block 286 has front and rear generally rectangular surfaces 318, 320, top and bottom edges 322, 324 and rounded side edges 326, 328 which curve inwardly from the rear surface 320 to the front surface 318 such that the rear surface 320 is larger than the front surface 318. The rounded side edges 326, 328 are positioned against the inner surfaces 296 of the third portions 304 of the clamping arms 276a, 276b and the top edge 288 is positioned to either abut against or to face a lower surface of the upper connecting member 266a. The push block 286 has an aperture 330 extending therethrough from the front surface 318 to the rear surface 320, which is generally aligned with the aperture 277 through the stabilizer 274.

The fastening member 282, preferably a screw, has a head portion 332 and a shank portion 334 extending therefrom. The head portion 332 is wider in outer dimension that is the shank portion 334. The shank portion 334 is preferably threaded. The head portion 332 is positioned against the front face of the stabilizer 274 and the shank portion 334 extends through the aperture 277 of the stabilizer 274 and through the aperture 330 of the push block 286 such that the shank portion 334 extends beyond the rear surface 320 of the push block 286.

The securing member 284, preferably a nut, has first and second portions 336, 338 and an aperture 340 extending therethrough. The aperture 340 has a larger diameter at the second portion 338 than at the first portion 336 and is threaded in the first portion 336. The shank portion 334 of the fastening member 282 is rotatably threaded and secured within the first portion 336 of the aperture 340. The outer surface of the second portion 338 may be configured in such a manner, e.g., threaded or hexed as illustrated, in order to assist in rotation of the securing member 284.

The adjustment assembly 280 is configured to move the clamping arms 276a, 276b toward or away from one another by either tightening or loosening the securing member 284 relative to the fastening member 282. By tightening the securing member 284 on the fastening member 282, the push block 286 is forced against the third portions 304 of the clamping arms 276a, 276b which causes the front edges 292 and the first and second portions 300, 302 of the clamping arms 276a, 276b, and thus the gripping members 310a, 310b; 312a, 312b to move toward one another. By loosening the securing member 284 on the fastening member 282, the push block 286 is moved away from the third portions 304 of the clamping arms 276a, 276b, and thus the gripping members 310a, 310b; 312a, 312b are free to be moved away from one another by hand so that larger diameter conduits 350 can be clamped.

Thus, the attachment system 202 can accommodate all sizes of conduit 350 with no adaptors because conduit 350 of different sizes will contact the gripping members 310a, 310b; 312a, 312b tangentially at different points. The pivot pins 278a, 278b extend generally parallel to a length of the conduit 350 when the conduit 350 is secured in place by the clamping assembly 242. The clamping arms 276a, 276b are V-shaped at the ends thereof which engage and trap the conduit 350 at four points on opposite sides (by the gripping members 310a, 310b; 312a, 312b). The clamping arms 276a, 276b have gripping members 310a, 310b; 312a, 312b which are serrated that radially nest against the threads 352 of the conduit 350 and axially against the conduit nut (not shown). The overhang portion 316 of the gripping members 310a, 310b; 312a, 312b act as a locational stop if the conduit 350 has no threads 352, nut, or rigid base near its lip. To provide the clamping force against the conduit 350, the clamping arms 276a, 276b have faces, namely the inner surface 296 of the third portions 304, which extend past the pivot point. The fastening member 282 and the securing member 284 between the faces of the clamping arms 276a, 276b act on the push block 286 which in turn acts against the faces of the clamping arms 276a, 276b. When the securing member 284 is moved inward, it causes the clamping arms 276a, 276b, and thus the gripping members 310a, 310b; 312a, 312b to be forced against the conduit 350.

The attachment system 202 provides a number of benefits. The attachment system 202 does not have a lot of loose parts that have to be transported along with the puller 200 which can be lost. Fewer connections also need to be made so that the set up time is also reduced. The attachment system 202 also has a large number of gripping points (namely four) which distributes load better and creates better stability due to the contact points being distributed around the entire diameter of the conduit 350. Also, in the process of pulling, the rope will generally pass within the boundary formed by the contact points which will prevent, or at least minimize, any torque reaction to the pulling apparatus due to an offset load. Additionally, there is no intrusion into the inside diameter of the conduit 350 by a clamp, which eliminates obstructions and allows conduit 350 to be filled with as much cabling as possible without violating any electric code. The attachment system 202 thus provides for the load bearing capability and torsional stiffness needed for higher force pulling, e.g., up to 4000 pounds force.

It is to be understood that the gripping/contact points referred to herein are meant to include the entire area at which the gripping members 310a, 310b; 312a, 312b are in contact with the outer surface of the conduit 350, regardless of how big or small the gripping/contact points are.

It is also to be understood that the attachment system 202 may be formed without the width-extension members 236 or with only one of the width-extension members 236.

It is further to be understood that the plates 254 of the elbow mounting member 240 need not be formed with the plurality of spaced apart adjustment apertures 260, but may be provided with only a single aperture 260, such that the elbow mounting member 240 may be provided in a fixed position, without the ability to adjust same relative to the boom 208.

Figure 23:
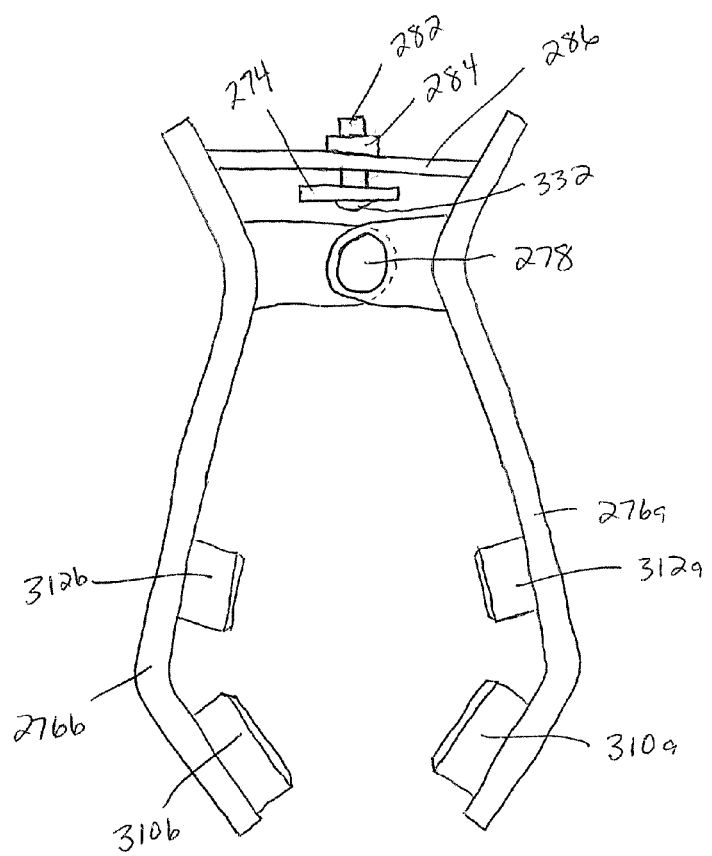
FIG. 23 is a top view of an alternative configuration of the clamping assembly.

It should further be understood that, if desired, one of the clamping arms 276a, 276b may be provided in a fixed position with only the other clamping arms 276a, 276b being pivotable with the push block 286 only needing to act against the pivotable clamping arm 276a, 276b. The clamping arms 276a, 276b may also be pivotable about a single pivot pin 278 as illustrated in FIG. 23. Further, it should be understood that the configuration of how the pivoting of the clamping arms 276a, 276b relative to one another is effected may be altered to a manner other than that described and illustrated therein. For instance, one or both of the pivot pins 278a, 278b may be provided along the inner surfaces 296 of the clamping arms 276a, 276b as opposed to the outer surfaces 298 of the clamping arms 276a, 276b. Also, the clamping arms 276a, 276b could be configured to overlap in a scissors-like manner such that they are able to rotate relative to one another about a single pivot pin. Of course, it is to be understood that minor modifications to the configuration of the clamping assembly 242 would have to be made in order for the clamping assembly 242 to work in the general manner described and illustrated herein, and it is to be understood that such modifications of the clamping assembly 242 are intended to be included within the scope of the invention.

It should also be understood that the push block 286 could be modified to include two separate push blocks if desired, one which acts on the clamping arm 276a and another which acts on the clamping arm 276b. Both push blocks could have apertures provided therethrough for receiving the fastening member 282 therethrough or only one of the push blocks could be acted on by the securing member 284 with the acted on push block then acting on the other push block. It is also to be understood that if two push blocks are provided, that two fastening members and two securing members may be provided, with one set acting on one of the push blocks and the other set acting on the other one of the push blocks.

While preferred embodiments of the present invention are shown and described, it is envisioned that those skilled in the art may devise various modifications of the present invention without departing from the spirit and scope of the appended claims.

The invention claimed is:

1. A cable puller comprising:
   a base;
   a puller assembly connected to said base;
   a boom extending from said puller assembly;
   a mounting member mounted to said boom; and
   a clamping assembly secured to said mounting member, said clamping assembly including first and second arms having first and second ends, each of said first and second arms extending at least partially through said mounting member, said first end of each said arm extending outwardly from said mounting member, said clamping assembly further including a member which is configured to bear directly against said first arm in order to move said first end of said first arm toward said first end of said second arm in order to secure the conduit between said first ends of said first and second arms, said member further being configured to separate from said first arm in order to allow said first end of said first arm to move away from said first end of said second arm in order to release the conduit from between said first and second arms.

2. The cable puller as defined in claim 1, wherein each said arm has first portions extending from said first ends thereof and second portions extending from said first portions, said first and second portions being angled to generally form a V-shape.

3. The cable puller as defined in claim 2, wherein said first arm has a third portion extending from said second portion thereof to said second end thereof.

4. The cable puller as defined in claim 2, wherein each said arm has first and second gripping members, said first gripping members extending from said first portions of said arms and said second gripping members extending from said second portions of said arms.

5. The cable puller as defined in claim 4, wherein each said gripping member includes a plurality of ribs for assisting in the securement of the conduit.

6. The cable puller as defined in claim 4, wherein each said gripping member has an overhang portion for creating a stop for the conduit.

7. The cable puller as defined in claim 1, wherein said mounting member is adjustably mounted to said boom such that a position of said mounting member and said clamping assembly, relative to said boom may be altered.

8. The cable puller as defined in claim 1, wherein said clamping assembly further includes a fastening member and a securing member, said fastening member not being integrally formed within said member, but being operably associated with said member, said securing member configured to be rotatably connected to said fastening member, whereby upon rotating said securing member in a first direction relative to said fastening member, said securing member acts against said member to move said second ends of said arms away from one another which, in turn, moves said first ends of said arms toward one another.

9. The cable puller as defined in claim 8, wherein said clamping assembly further includes a stabilizer which is secured to said mounting member and positioned between said first and second arms, said fastening member being operably associated within said stabilizer.

10. The cable puller as defined in claim 8, wherein said fastening member is a screw and said securing member is a nut.

11. The cable puller as defined in claim 1, wherein said first and second arms have first and second gripping members extending therefrom, said gripping members configured to trap and secure the conduit therebetween at four separate points around an outer diameter of the conduit.

12. The cable puller as defined in claim 1, wherein said first arm is configured to move about a pivot such that when said second end of said first arm is moved away from said second end of said second arm, said first end of said first arm is moved toward said first end of said second arm, and wherein said member is configured to bear directly against said first arm proximate to said second end thereof in order to move said second end of said first arm away from said second end of said second arm.

13. The cable puller as defined in claim 12, wherein each said arm has first portions extending from said first ends thereof and second portions extending from said first portions, said first and second portions being angled to generally form a V-shape, and wherein said first arm has a third portion extending from said second portion thereof to said second end thereof, said pivot being provided proximate to said second and third portions thereof.

14. The cable puller as defined in claim 12, wherein each said arm has first portions extending from said first ends thereof and second portions extending from said first portions, said first and second portions being angled to generally form a V-shape, and wherein each said arm has first and second gripping members, said first gripping members extending from said first portions of said arms and said second gripping members extending from said second portions of said arms, and each said gripping member has an overhang portion for creating a stop for the conduit in a direction parallel to said pivot.

15. The cable puller as defined in claim 12, wherein said second arm is configured to move about said pivot such that when said second end of said second arm is moved away from said second end of said first arm, said first end of said second arm is moved toward said first end of said first arm, wherein said member is configured to bear directly against said second arm proximate to said second end thereof in order to move said second end of said second arm away from said second end of said first arm, and wherein said member is further configured to be separated from said second arm in order to allow said second end of said second arm to move toward said second end of said first arm.

16. The cable puller as defined in claim 12, wherein said first arm is configured to move about said pivot and wherein said second arm is configured to move about a second, separate pivot such that when said second end of said second arm is moved away from said second end of said first arm, said first end of said second arm is moved toward said first end of said first arm, wherein said member is configured to bear directly against said second arm proximate to said second end thereof in order to move said second end of said second arm away from said second end of said first arm, and wherein said member is further configured to be separated from said second arm in order to allow said second end of said second arm to move toward said second end of said first arm.

17. The cable puller as defined in claim 1, wherein said member is a push block.

* * * * *